United States Patent
Kikuchi et al.

(10) Patent No.: US 8,395,677 B2
(45) Date of Patent: Mar. 12, 2013

(54) ABERRATION CORRECTION APPARATUS, ABERRATION CORRECTION METHOD, AND PROGRAM

(75) Inventors: Atsuo Kikuchi, Kanagawa (JP); Gentaro Irisawa, Kanagawa (JP); Atsuo Minato, Kanagawa (JP); Kenichi Nishio, Kanagawa (JP); Hyongmyong Kang, Tokyo (JP); Hiroyuki Kinoshita, Tokyo (JP); Tsukasa Hashino, Kanagawa (JP)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 13/226,978

(22) Filed: Sep. 7, 2011

(65) Prior Publication Data
US 2012/0081583 A1    Apr. 5, 2012

(30) Foreign Application Priority Data

Sep. 21, 2010 (JP) ................. 2010-210692

(51) Int. Cl.
| | |
|---|---|
| H04N 5/228 | (2006.01) |
| H04N 9/73 | (2006.01) |
| H04N 5/262 | (2006.01) |
| H04N 9/64 | (2006.01) |
| H04N 9/74 | (2006.01) |
| G06K 9/00 | (2006.01) |

(52) U.S. Cl. ............. 348/222.1; 348/223.1; 348/240.99; 348/242; 348/587; 348/592; 382/148; 382/162; 382/167

(58) Field of Classification Search ................ 348/222.1, 348/223.1, 240.99, 234, 210.99, 237, 182, 348/587, 592, 242, 253, 260, 266, 280, 336, 348/345; 382/148, 162, 167
See application file for complete search history.

(56) References Cited

U.S. PATENT DOCUMENTS
2003/0194143 A1    10/2003   Iida
(Continued)

FOREIGN PATENT DOCUMENTS
| | | |
|---|---|---|
| EP | 1 473 671 A2 | 11/2004 |
| JP | 8-205181 | 8/1996 |
| JP | 2008-294692 | 12/2008 |

OTHER PUBLICATIONS
U.S. Appl. No. 13/190,900, filed Jul. 26, 2011, Irisawa, et al.
(Continued)

*Primary Examiner* — Lin Ye
*Assistant Examiner* — Marly Camargo
(74) *Attorney, Agent, or Firm* — Oblon, Spivak, McClelland, Maier & Neustadt, L.L.P.

(57) ABSTRACT

An aberration correction apparatus includes: a correction data holding section that holds correction data on a correction level used to correct chromatic aberration of magnification; a center position discrepancy data holding section that holds center position discrepancy data on the discrepancy between the center of an image area and the position of an aberration center of the chromatic aberration of magnification; an aberration center calculating section that selects one of the center position discrepancy data that corresponds to a combination of the discrepancy variation conditions in an imaging apparatus and calculates the position of the aberration center based on the selected center position discrepancy data; an image height calculating section; a magnification chromatic aberration correction level calculating section; and a pixel value correcting section.

10 Claims, 21 Drawing Sheets

U.S. PATENT DOCUMENTS

2004/0218813 A1*  11/2004  Okada et al. .................. 382/167
2006/0232681 A1*  10/2006  Okada ........................ 348/222.1
2007/0177019 A1    8/2007  Reichenbach et al.
2008/0291447 A1   11/2008  Vakrat et al.
2009/0207271 A1*   8/2009  Utsugi et al. ............... 348/223.1
2012/0044369 A1*   2/2012  Irisawa et al. ............. 348/208.4

OTHER PUBLICATIONS

Extended European Search Report issued Dec. 30, 2011, in Patent Application No. 11181193.1.

* cited by examiner

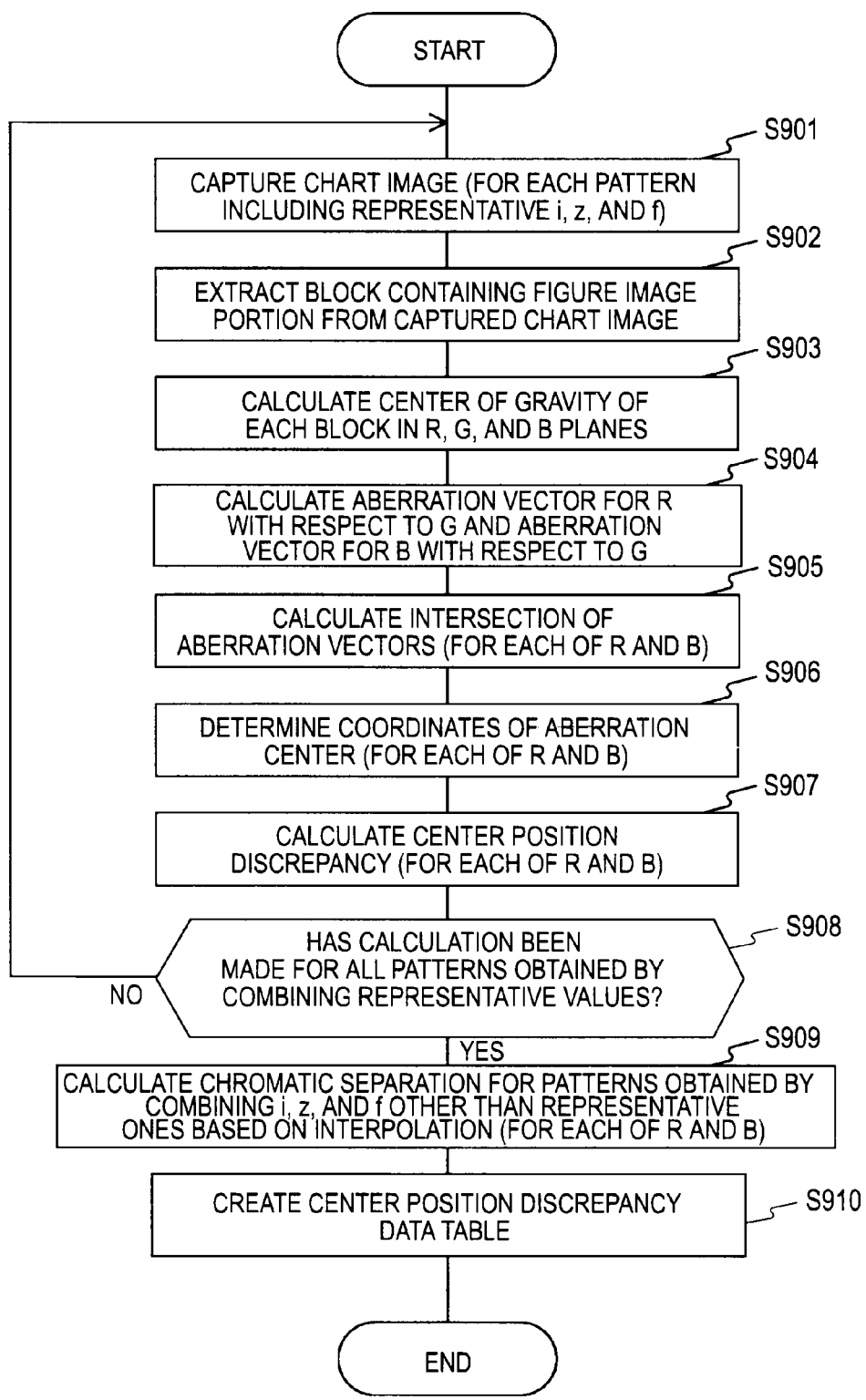

ABERRATION CORRECTION APPARATUS, ABERRATION CORRECTION METHOD, AND PROGRAM

FIELD

The present disclosure relates to an aberration correction apparatus, and particularly to an aberration correction apparatus that corrects chromatic aberration of magnification, a method used in the aberration correction apparatus, and a program that instructs a computer to execute the method.

BACKGROUND

It has been known that light having passed through a lens suffers from chromatic aberration of magnification. The chromatic aberration of magnification occurs from the fact that when an image is formed through a lens, light rays of different colors are magnified at different scales because the lens has different refractive indices for different wavelengths. For example, when an image of a white-light point source is captured, the captured image shows rainbow-colored concentric rings around the position corresponding to the optical axis of the lens.

The chromatic aberration of magnification needs to be corrected because it appears in the form of chromatic halation in a captured image and leads to degradation of the quality thereof. To this end, an imaging apparatus has been provided with a function of correcting chromatic aberration of magnification by processing a captured image signal. One of the known techniques of related art for correcting chromatic aberration of magnification is a method for establishing the relationship between information on unwanted shift produced by the aberration and the state of the lens, storing the information and the lens state related to each other, and using the information on unwanted shift to perform data interpolation (see JP-A-8-205181 (FIG. 1), for example).

The technique of related art described above, however, works only when the center of an image area coincides with the center of the portion where chromatic aberration of magnification occurs (hereinafter also referred to as aberration center). The position in an image that is expressed in the form of distance in the radial direction around the optical axis is called an image height. When the image height is fixed, the amount of chromatic shift due to chromatic aberration of magnification is fixed. Chromatic aberration of magnification at pixels symmetric about the center of the image area can therefore be corrected by using the same correction level as long as the center of the image area coincides with the aberration center.

In practice, however, the optical axis of the lens may not coincide with the center of the image area in some cases due, for example, to an error associated with lens assembling operation. In this case, the aberration center does not coincide with the center of the image area, and hence the image height with respect to the center of the image area does not coincide with the center of a pattern that actual concentric chromatic aberration of magnification forms. When the correction of related art described above is directly made in this state, a pixel at a certain image height on the image area undergoes correction based on an incorrect image height, resulting in overcorrection or undercorrection.

To address the problem, the following related art is known: Images of a chart having two straight lines drawn in each of the horizontal and vertical directions are captured with the zoom position of a zoom lens changed, and the aberration centers or the positions of the optical axis on the image area are detected based on the captured images. The information on the thus detected positions of the optical axis is used to control the optical axis when chromatic aberration of magnification is corrected (see JP-A-2008-294692 (FIG. 3), for example).

SUMMARY

In the latter related art, however, a user needs to provide a chart only for the correction purpose and change the zoom position by actually operating the zoom lens to capture images of the chart, which is cumbersome and places a great burden on the user. Further, since the related art relies on the user to detect the optical axis, the position of the aberration center may not be detected with precision if the imaging apparatus is inappropriately operated in the detection process. In this case, satisfactory correction will not be achieved.

Thus, it is desirable to correct chromatic aberration of magnification that occurs when the position of the center of the image area does not coincide with the position of the aberration center without any burden on the user but with high precision.

An aberration correction apparatus according to an embodiment of the present disclosure includes a correction data holding section that holds correction data on a correction level used to correct chromatic aberration of magnification, the correction data provided for each predetermined combination of aberration variation conditions that change a chromatic separation level due to the chromatic aberration of magnification and include at least an image height, a center position discrepancy data holding section that holds center position discrepancy data on the discrepancy between the center of an image area and the position of an aberration center of the chromatic aberration of magnification, the center position discrepancy data provided for each combination of predetermined discrepancy variation conditions that change the discrepancy, an aberration center calculating section that selects one of the center position discrepancy data that corresponds to a combination of the discrepancy variation conditions in an imaging apparatus and calculates the position of the aberration center based on the selected center position discrepancy data, an image height calculating section that calculates an aberration center corresponding image height of a processed pixel with respect to the position of the aberration center, a magnification chromatic aberration correction level calculating section that selects one of the correction data that corresponds to a combination of the aberration variation conditions in the imaging apparatus and calculates a magnification chromatic aberration correction level based on the selected correction data, and a pixel value correcting section that corrects the pixel value of the processed pixel based on the calculated magnification chromatic aberration correction level. The aberration correction apparatus can correct chromatic aberration of magnification that occurs when the center of the image area does not coincide with the aberration center by determining a magnification chromatic aberration correction level with respect to the position of the aberration center according to the discrepancy variation conditions.

The image height calculating section may calculate the aberration center corresponding image height provided that the distance from the aberration center to each vertex of the image area is a 100% image height and an aberration center reference 100% image height distance in a radial direction passing through the processed pixel with respect to the position of the aberration center, and the correction level calculating section may calculate the magnification chromatic aberration correction level based on the ratio of the aberration center reference 100% image height distance to a 100% image height distance corresponding to the distance from the center of the image area to a vertex thereof. The thus configured image height calculating section and correction level calculating section can correct the processed pixel by using correction data corresponding up to the 100% image height but using a correction level calculated based on an appropriate ratio according to the distance from the aberration center.

The magnification chromatic aberration correction level calculating section, when the aberration center corresponding image height is greater than a 100% image height corresponding to the distance from the center of the image area to a vertex thereof, may select one of the correction data that corresponds to the combination of the current aberration variation conditions including the aberration center corresponding image height replaced with the 100% image height. The thus configured magnification chromatic aberration correction level calculating section can correct chromatic aberration of magnification at a processed pixel where the aberration center corresponding image height is greater than the 100% image height by using the correction level corresponding to the 100% image height.

The correction data holding section may hold correction data corresponding to image heights up to a predetermined value greater than a 100% image height corresponding to the distance from the center of the image area to a vertex thereof. The thus configured correction data holding section allows correction of chromatic aberration of magnification at a processed pixel where the aberration center corresponding image height is greater than the 100% image height based on the correction data held in correspondence with this aberration center corresponding image height.

Lens control information may represent control states of one or more predetermined movable portions in a lens section. The thus configured lens control information allows chromatic aberration of magnification to be corrected based on correction data and center position shift data according to the control state of a predetermined movable portion in the lens section.

The center position discrepancy data holding section may hold, among a plurality of sets of center position discrepancy data representing discrepancies of the positions of different aberration centers, center position discrepancy data that provides the least amount of residual aberration at a processed pixel having undergone the pixel value correction performed by the pixel value correcting section. In this way, an optimum one from the center position discrepancy data provided in advance can be selected, and the center position discrepancy data holding section is allowed to hold the optimum center position discrepancy data.

The embodiment of the present disclosure can advantageously correct chromatic aberration of magnification that occurs when the position of the center of the image area does not coincide with the position of the aberration center without any burden on the user but with high precision.

BRIEF DESCRIPTION OF THE DRAWINGS

FIG. 7 is a flowchart showing an exemplary procedure of creating the center position discrepancy data table;

DETAILED DESCRIPTION

Forms for carrying out the present disclosure (hereinafter referred to as embodiments) will be described below. The description will be made in the following order.

1. First Embodiment (to correct chromatic aberration of magnification in image region where image height is greater than 100% image height, correction data corresponding to 100% image height is used)

2. Second Embodiment (to correct chromatic aberration of magnification in image region where image height is greater than 100% image height, correction data corresponding to image heights greater than or equal to 100% image height determined in simulation are used)

3. Third Embodiment (to correct chromatic aberration of magnification, correction level is calculated based on ratio of 100% image height to image height of pixel to be processed)

4. Fourth Embodiment (to correct chromatic aberration of magnification, a plurality of correction data tables are provided and correction data table that provides least amount of residual chromatic aberration is used)

1. First Embodiment

Figure 1:
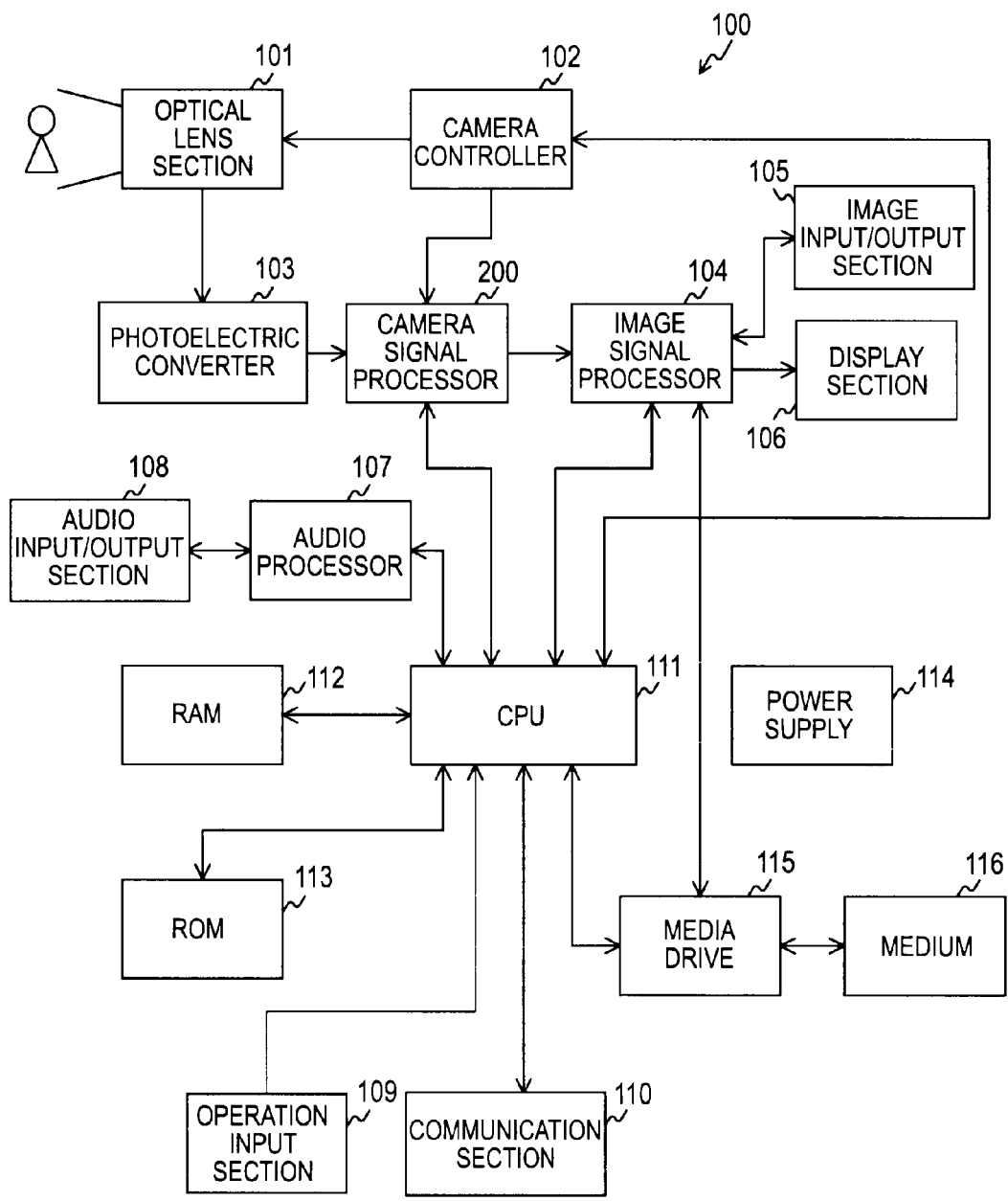
FIG. 1 shows an exemplary configuration of a video camcorder in an embodiment of the present disclosure.

FIG. 1 shows an exemplary configuration of a video camcorder 100 presented as an example of an imaging apparatus that embodies an embodiment of the present disclosure. The video camcorder 100 includes an optical lens section 101, a camera controller 102, a photoelectric converter 103, a camera signal processor 200, an image signal processor 104, an image input/output section 105, a display section 106, an audio processor 107, an audio input/output section 108, an operation input section 109, and a communication section 110. The video camcorder 100 further includes a CPU (central processing unit) 111, a RAM (random access memory) 112, a ROM (read only memory) 113, a media drive 115, and a power supply 114.

The optical lens section 101 includes the following built-in components: a group of lenses for capturing images of a subject, an aperture adjusting mechanism, a focus adjusting mechanism, a zoom mechanism, a shutter mechanism, and a hand-shake correcting mechanism. The camera controller 102 receives a control signal from the CPU 111 and produces a control signal to be supplied to the optical lens section 101. The camera controller 102 supplies the optical lens 101 with the produced control signal to perform zoom control, focus control, shutter control, exposure control, and other control operations.

The photoelectric converter 103, which is formed of an imaging device, has an imaging surface on which an image through the optical lens section 101 is focused. The imaging device can, for example, be a CCD (charge coupled device) sensor or a CMOS (complementary metal oxide semiconductor) sensor. The photoelectric converter 103 converts the subject image focused on the imaging surface into an image signal and supplies the image signal to the camera signal processor 200.

The image signal inputted to the camera signal processor 200 carries what is called raw image data, data not having undergone demosaicking or other color interpolation processes. The camera signal processor 200 performs necessary image signal processing, such as the color interpolation described above and a variety of other correction operations, on an image signal in the raw data format. In the embodiments of the present disclosure, the camera signal processor 200 performs image signal processing for correcting chromatic aberration of magnification. The image signal processed by the camera signal processor 200 is supplied to the image signal processor 104.

The image signal processor 104 performs image signal processing primarily related, for example, to displaying, recording, and reproducing operations on the supplied image signal. For example, the image signal processor 104 can perform image compression based on MPEG (moving picture experts group) or any other compression scheme on the inputted image signal.

The image signal processor 104 can produce an image signal in a predetermined format and outputs the image signal to an external apparatus via the image input/output section 105. The image input/output section 105 also allows an image signal in a predetermined format to be inputted therethrough from an external apparatus. The image signal processor 104 can convert the size of the image signal inputted through the image input/output section 105 or otherwise process the image signal and display the converted image signal on the display section 106. The image signal processor 104 can also convert the image signal inputted through the image input/output section 105 into image data to be recorded and supply the image data, for example, to the media drive 115 via the CPU 111.

The video camcorder 100, which includes the audio processor 107 and the audio input/output section 108, can input and output an audio signal. The audio input/output section 108 is a portion through which an audio signal is inputted and outputted. An audio signal inputted through the audio input/output section 108 first undergoes necessary audio signal processing in the audio processor 107. For example, the audio signal undergoes compression based on a predetermined audio compression encoding scheme. The audio input/output section 108 can also output an audio signal in a predetermined format supplied from the audio processor 107 to an external apparatus.

In this case, the CPU 111 can combine the compressed image signal supplied from the image signal processor 104 and the compressed image audio signal supplied form the audio processor 107 to form an image/audio file in a predetermined format. The image/audio file used herein is, for example, a video image file so formatted that audio is reproduced in synchronization with video images.

Data in the image/audio file is supplied, for example, as written data to the media drive 115 under the control of the CPU 111. The media drive 115, in cooperation with the CPU 111, can write and read the data to and from a physical layer or any other portion of a medium (recording medium) 116. The medium 116 is, for example, a magnetic disk, an optical disk, a magneto-optical disk, or a semiconductor memory. The medium 116 may, for example, be one permanently built in the video camcorder 100. Alternatively, the medium 116 may be one that complies with a predetermined standard and can be loaded and unloaded to and from the video camcorder 100.

The media drive 115 receives transferred data to be recorded in a file or otherwise processed and writes the data to be recorded onto the medium 116 selected as a controlled recording object. The data recorded on the medium 116 is managed on a file basis, for example, by using a predetermined file system.

To reproduce a file, specifically an image/audio file, recorded on the medium 116, the CPU 111 and the media drive 115 access the medium on which the specified image/audio file has been recorded and read the file. The thus read image/audio file is, for example, so processed by the CPU 111 that the file is separated into compressed image signal data and compressed audio signal data. The compressed image signal data is delivered to the image signal processor 104, and the compressed audio signal data is delivered to the audio processor 107.

In this case, the image signal processor 104 and the audio processor 107 perform necessary reproduction signal processing, including decoding, on the compressed image signal data and the compressed audio signal data transferred as described above. Images reproduced from the compressed video data can then be displayed on the display section 106. Further, an audio signal reproduced from the compressed audio signal data can be outputted in the form of actual audio through a loudspeaker accommodated in the audio input/output section 108 or can be outputted through a headphone terminal in synchronization with the reproduced images.

The CPU 111 performs a variety of control operations on the video camcorder 100 by executing a program. The RAM 112 is used as a work area (work memory) by the CPU 111 to carry out processes according to the program. The ROM 113 stores, for example, a variety of programs executed by the CPU 111, a variety of pieces of setting information used by the CPU 111 when it carries out a variety of processes.

The operation input section 109 in this case collectively shows a variety of operation components with which the video camcorder 100 is provided. Examples of the operation components on the operation input section 109 include a recording button operated to start and stop recording captured images, an operation component by which an imaging mode is selected, and operation components for changing a variety of parameters.

The communication section 110 is a portion through which the video camcorder 100 communicates with an external device based on a predetermined data communication scheme under the control of the CPU 111. The data communication scheme based on which the communication portion 110 communicates should not be particularly limited to a specific one, irrespective of wired or wireless one, and the number of data communication schemes based on which the communication portion 110 communicates should not be limited. At present, examples of the data communication scheme may be Ethernet® and other wired networks. USB (universal serial bus), IEEE (Institute of Electrical and Electronic Engineers) 1394, and other data interface standards can also be used. Wireless candidates may include Bluetooth® and other inter-device, near distance wireless communication schemes and IEEE 802.11a/b/g and other wireless LAN (local area network) standards.

The power supply 114 supplies operating electric power to a variety of hardware devices in the video camcorder 100 and includes a power supply circuit that operates when it receives electric power, for example, from a battery or through a power supply adapter.

It is noted that the present disclosure is not necessarily embodied by the video camcorder 100 shown in FIG. 1 but can alternatively be embodied, for example, by a digital still camera.

[Exemplary Configuration of Camera Signal Processor]

Figure 2:
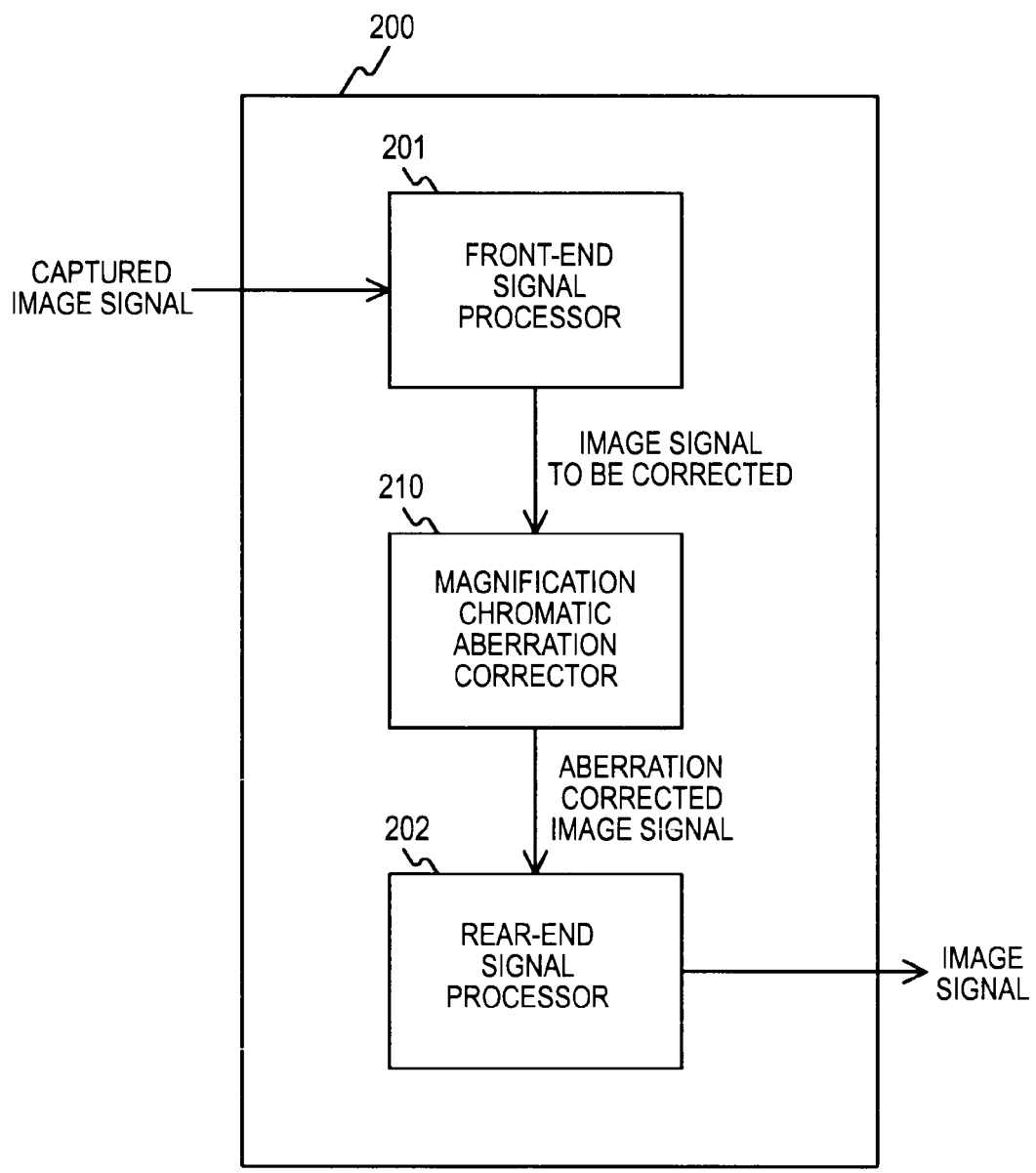
FIG. 2 shows an exemplary configuration of a camera signal processor in an embodiment of the present disclosure.

FIG. 2 shows an exemplary configuration of the camera signal processor 200 shown in FIG. 1. The camera signal processor 200 shown in FIG. 2 includes a front-end signal processor 201, a magnification chromatic aberration corrector 210, and a rear-end signal processor 202.

The front-end signal processor 201 performs black level correction, gain correction, and other correction processes on an inputted image signal in the raw image data format. The magnification chromatic aberration corrector 210 receives an image signal to be corrected, specifically, the image signal in the raw image data format having undergone the processes performed by the front-end signal processor 201, and performs image signal processing for correcting chromatic aberration of magnification. The image signal processing for correcting chromatic aberration of magnification performed by the magnification chromatic aberration corrector 210 will be described later. The rear-end signal processor 202 receives the aberration corrected image signal having undergone the process performed by the magnification chromatic aberration corrector 210 and performs color conversion, color interpolation, gamma correction, and other image signal processing operations.

[Chromatic Aberration of Magnification]

Figure 3A:
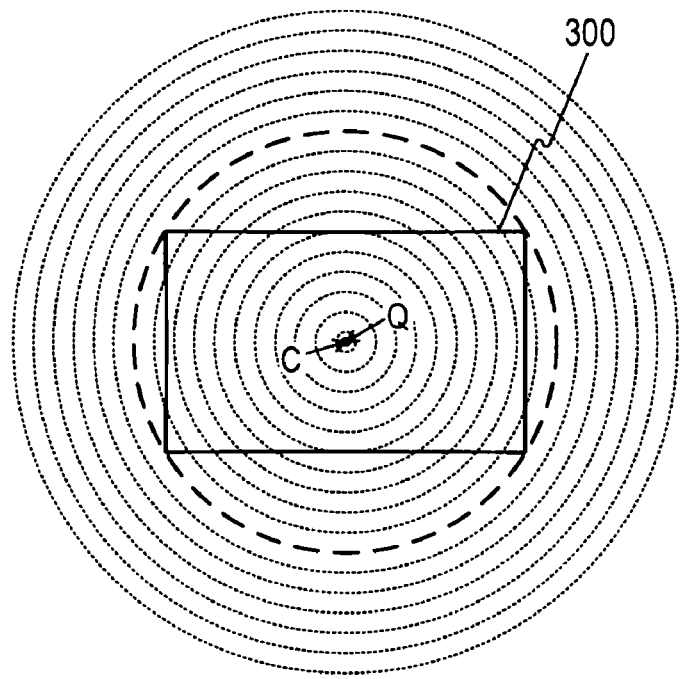
FIGS. 3A and 3B compare a basic pattern in which chromatic aberration of magnification occurs with a pattern in which chromatic aberration of magnification occurs resulting from individual product variations of a lens.
Figure 3B:
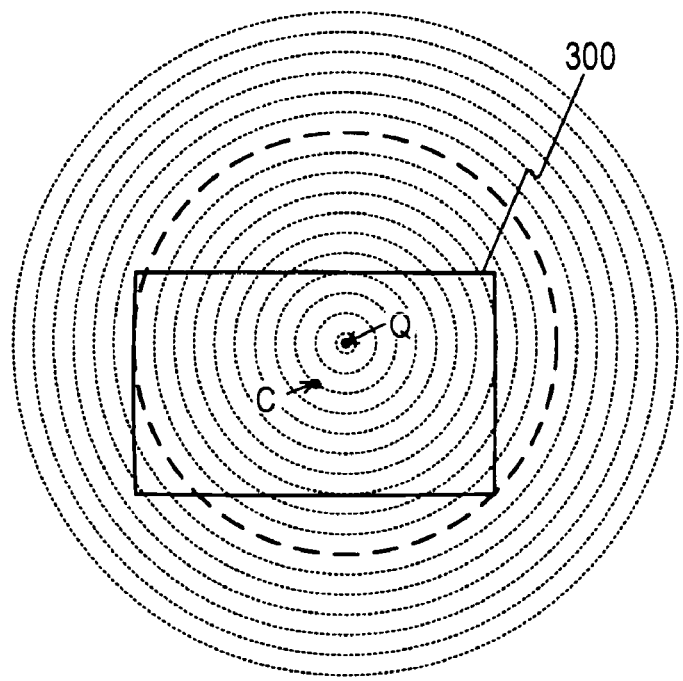

The chromatic aberration of magnification is a chromatic separation phenomenon that occurs from the fact that when an image is formed through a lens, light rays of different colors are magnified at different scales because the lens has different refractive indices for different wavelengths. FIGS. 3A and 3B diagrammatically show chromatic aberration of magnification that appears in an image area 300 of a captured image. In FIGS. 3A and 3B, perfectly circular, broken contour lines show chromatic separation resulting from the chromatic aberration of magnification that appears in the image area 300.

First, FIG. 3A shows a state in which an image center C, which is the center of the image area 300 (intersection of diagonals each of which connects opposing vertices of the image area 300), coincides with an aberration center Q of the chromatic aberration of magnification.

Chromatic aberration of magnification causes chromatic separation having a concentric pattern around the position corresponding to the optical axis of a lens. In FIGS. 3A and 3B, the center of the concentric aberration pattern that corresponds to the optical axis of the lens is the aberration center Q. The amount of actual chromatic separation increases, for example, with the image height with respect to the aberration center Q (optical axis).

The chromatic aberration of magnification shown in FIG. 3A can be considered as a result of the characteristics of the lens itself. On the other hand, in an actual imaging apparatus, an error associated with lens assembling operation or any other defect may cause the optical axis of the lens, that is, the aberration center Q, not to coincide with the image center C, which is the center of the image area 300, or chromatic aberration of magnification to occur. FIG. 3B shows another example of chromatic aberration of magnification that occurs when the aberration center Q does not coincide with the image center C. Since the chromatic aberration of magnification described above results from an error associated with lens assembling operation or other individual product variations, the discrepancy between the image center C and the aberration center Q varies accordingly. In the embodiments of the present disclosure, the chromatic aberration of magnification that occurs as shown in FIG. 3B will be corrected in several manners described below.

[Configuration of Magnification Chromatic Aberration Corrector]

Figure 4:
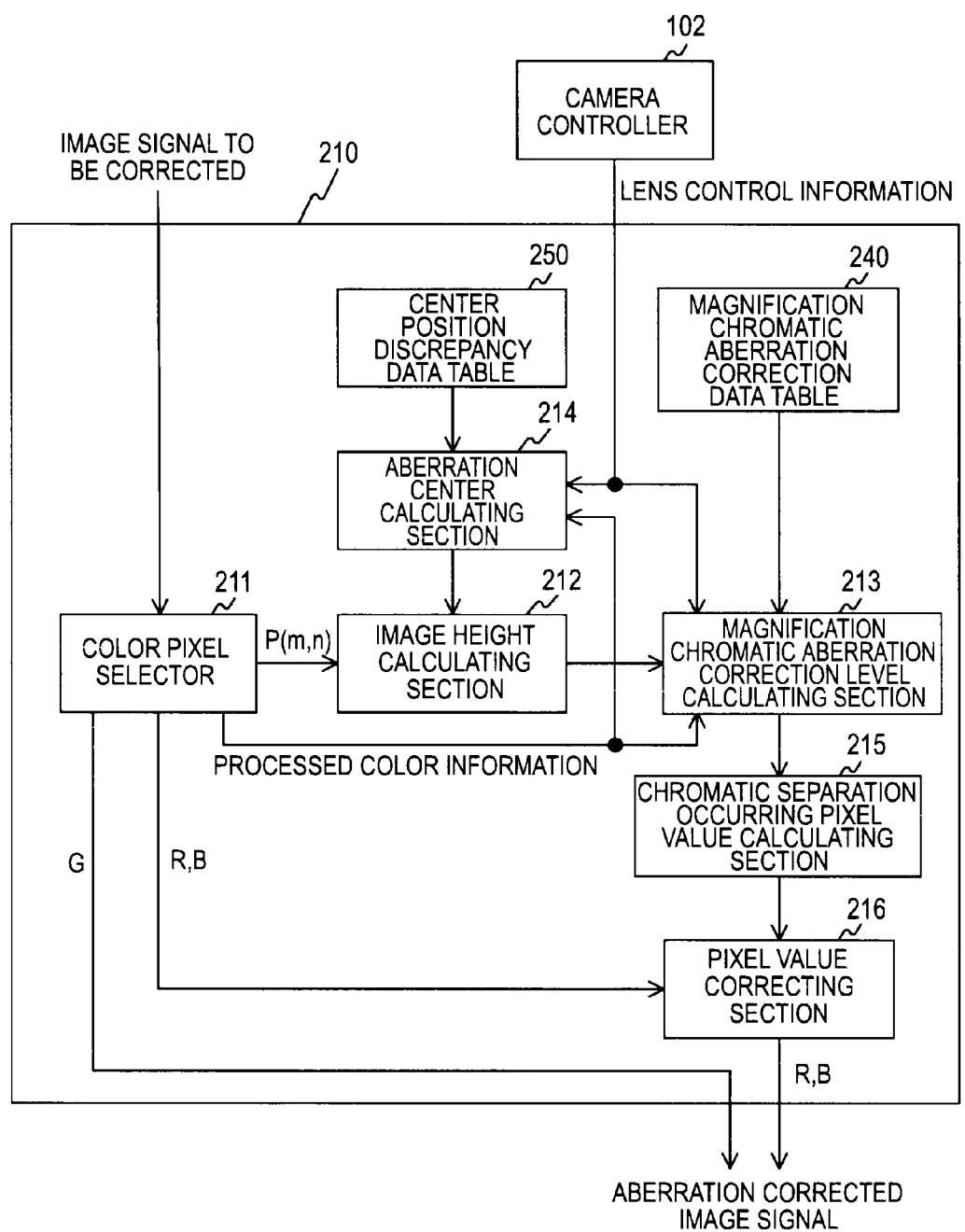
FIG. 4 shows an exemplary configuration of a magnification chromatic aberration corrector in a first embodiment of the present disclosure.

In the embodiments of the present disclosure, chromatic aberration of magnification is corrected by the magnification chromatic aberration corrector 210 shown in FIG. 2. FIG. 4 shows an exemplary configuration of the magnification chromatic aberration corrector 210 according to the first embodiment of the present disclosure.

The magnification chromatic aberration corrector 210 shown in FIG. 4 includes a color pixel selector 211, an image height calculating section 212, a magnification chromatic aberration correction level calculating section 213, an aberration center calculating section 214, a chromatic separation occurring pixel value calculating section 215, and a pixel value correcting section 216. The magnification chromatic aberration corrector 210 further stores and holds a magnification chromatic aberration correction data table 240 and a center position discrepancy data table 250.

An image signal to be corrected that the magnification chromatic aberration corrector 210 receives is expressed in the raw image data format as described above and formed, for example, of R (red), G (green), and B (blue) color pixel signals according to the layout of a color filter that faces the pixels of the light receiving device in the photoelectric converter. The color pixel selector 211 selects and extracts the R pixel signal and the B pixel signal from the inputted image signal to be corrected and sequentially outputs the extracted image signals as pixels to be processed to the pixel value correcting section 216 at predetermined timings. The color pixel selector 211 further selects and extracts the G pixel signal and outputs it as a G signal component of an aberration corrected pixel signal to be outputted from the magnification chromatic aberration corrector 210. The magnification chromatic aberration corrector 210 according to the first embodiment of the present disclosure then corrects the pixel values of the pixels that form an R image area and the pixels that form a B image area. The color pixel selector 211 further outputs information on coordinates P(m, n) of a pixel to be processed to the image height calculating section 212. The color pixel selector 211, when selecting the color pixels, recognizes the coordinates of each of the pixels. The color pixel selector 211 further supplies the magnification chromatic aberration correction level calculating section 213 and the aberration center calculating section 214 with processed color information representing which color, R or G, has been selected as the color of the pixels to be processed.

The image height calculating section 212 calculates an image height in the image area that corresponds to the coordinates (m, n) of an inputted pixel to be processed.

The magnification chromatic aberration correction data table 240 stores correction data used to correct chromatic separation resulting from chromatic aberration of magnification. An example of the table structure of the magnification chromatic aberration correction data table 240 and an example of a method for acquiring the correction data to be stored in the magnification chromatic aberration correction data table 240 will be described later. The magnification chromatic aberration correction data table 240 is, in practice, stored in a memory in the magnification chromatic aberration corrector 210, the ROM 113 shown in FIG. 1, or any other suitable component. The memory and the ROM 113 are examples of the correction data holding section set forth in the appended claims.

The magnification chromatic aberration correction level calculating section 213 calculates a correction level corresponding to chromatic aberration of magnification. To this end, the magnification chromatic aberration correction level calculating section 213 receives lens control information including an aperture value, a zoom position, and a focus position from the camera controller 102 and further receives the image height calculated by the image height calculating section 212. The magnification chromatic aberration correction level calculating section 213 further receives the processed color information from the color pixel selector 211. The magnification chromatic aberration correction level calculating section 213 further receives information on the position (coordinates) of the aberration center calculated by the aberration center calculating section 214, which will be described later.

In the lens control information, the aperture value represents the value set for an aperture accommodated in the optical lens section 101. The zoom position represents the position of a zoom lens accommodated in the optical lens section 101. The focus position represents the position of a focus lens accommodated in the optical lens section 101. The camera controller 102, which performs exposure control, zoom control, focus control, and other camera control operations as described above, calculates and holds the aperture value, the zoom position, and the focus position as the results of the control operations described above.

The magnification chromatic aberration correction level calculating section 213 then selects a correction level corresponding to the combination of the aperture value, the zoom position, the focus position, the image height, and the color indicated by the processed color information from the magnification chromatic aberration correction data table 240. The magnification chromatic aberration correction level calculating section 213 then uses the selected correction level to calculate a correction level for correcting the chromatic separation resulting from chromatic aberration of magnification.

The center position discrepancy data table 250 stores the discrepancy between the image center C and the aberration center Q. The discrepancy of the aberration center Q used herein is expressed by a two-dimensional vector starting at the image center C and ending at the aberration center Q. An example of the table structure of the center position discrepancy data table 250 and an example of a method for acquiring correction level data to be stored in the center position discrepancy data table 250 will be described later. The center position discrepancy data table 250 is, in practice, also stored in the memory in the magnification chromatic aberration corrector 210, the ROM 113 shown in FIG. 1, or any other suitable component. The memory and the ROM 113 are examples of the center position discrepancy data holding section set forth in the appended claims.

The aberration center calculating section 214 calculates the position of the aberration center Q. Specifically, the aberration center calculating section 214 calculates the position of the aberration center Q in the form of coordinates in the image area 300. To this end, the aberration center calculating section 214 receives the aperture value information, the zoom position information, and the focus position information from the camera controller 102. The aberration center calculating section 214 further receives the processed color information from the color pixel selector 211. The aberration center calculating section 214 then selects center position discrepancy data corresponding to the combination of the aperture value information, the zoom position information, the focus position information, and the color indicated by the processed color information from the center position discrepancy data table 250. The aberration center calculating section 214 then uses the selected center position discrepancy data to calculate the position of the aberration center Q. The image height calculating section 212 uses the calculated position of the aberration center Q to calculate the image height.

The chromatic separation occurring pixel value calculating section 215 uses the magnification chromatic aberration correction level calculated as described above to calculate the pixel value of a chromatic separation occurring pixel. The chromatic separation occurring pixel used herein is a pixel where the light that should inherently be focused in the position of a pixel to be processed is actually focused due to the shift resulting from chromatic aberration of magnification.

The pixel value correcting section 216 corrects the pixel value of each pixel to be processed. To this end, the pixel value correcting section 216 rewrites the pixel value of a pixel to be processed with the pixel value of the chromatic separation occurring pixel calculated by the chromatic separation occurring pixel value calculating section 215.

The sections in the magnification chromatic aberration corrector 210 shown in FIG. 4 can be achieved, for example, by using a DSP (digital signal processor) to execute a program. Alternatively, at least part of the functions of the magnification chromatic aberration corrector 210 may be achieved by using the CPU 111 to execute a program or by using hardware.

[Exemplary Structure of Magnification Chromatic Aberration Correction Data Table]

Figure 5:
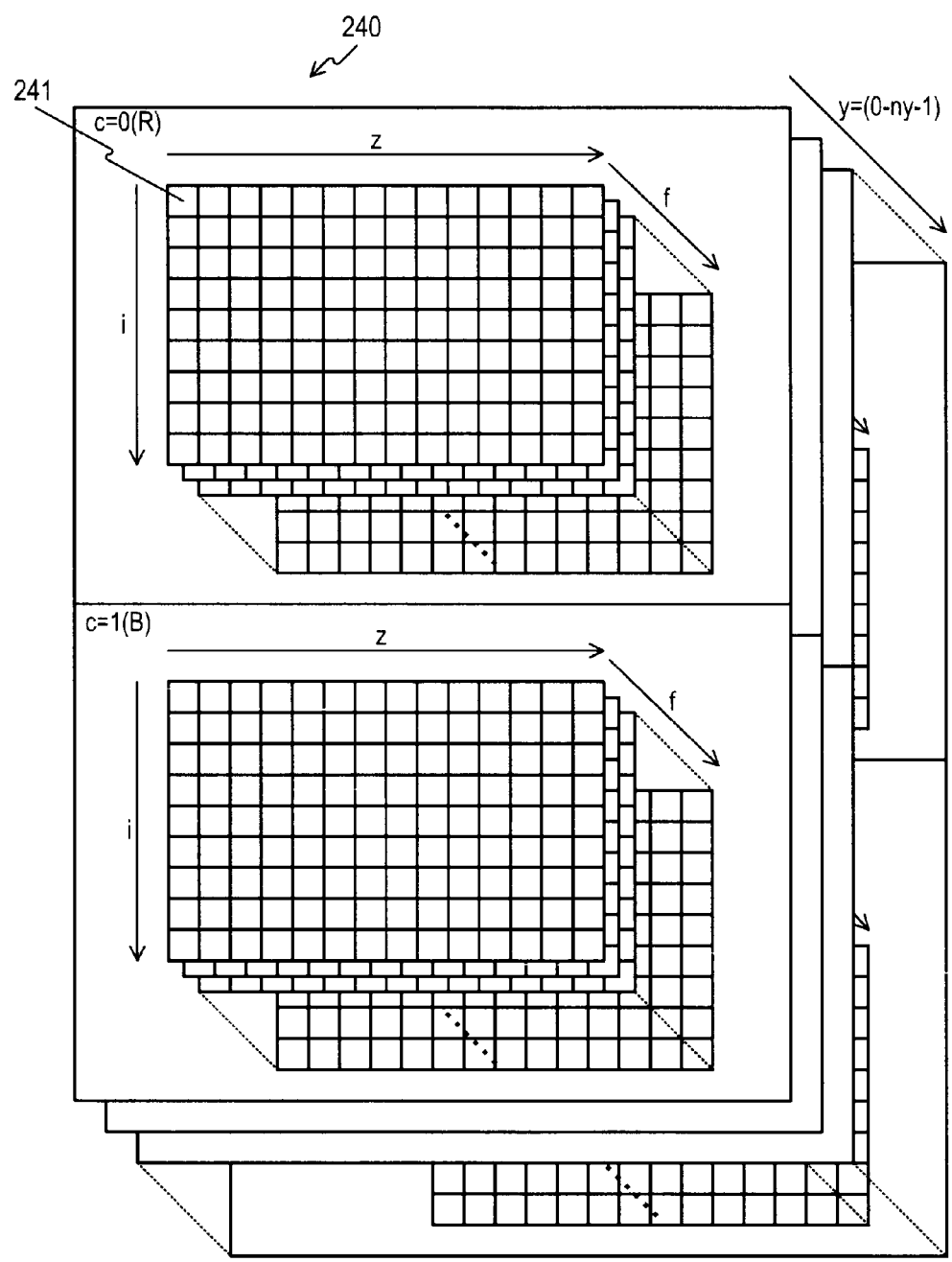
FIG. 5 shows an exemplary structure of a magnification chromatic aberration correction data table in the first embodiment of the present disclosure.

An exemplary structure of the magnification chromatic aberration correction data table 240 will be subsequently described with reference to FIG. 5. FIG. 5 diagrammatically shows the table structure of the magnification chromatic aberration correction data table 240. Before describing FIG. 5, let a variable i ($0 \leq i < ni$) be the aperture value, a variable z ($0 \leq x < nz$) be the zoom position, a variable f ($0 \leq f < nf$) be the focus position, and a variable y ($0 \leq y < ny$) be the image height. Although an actual aperture value, zoom position, focus position, and image height can have fractional parts, an aperture value, a zoom position, a focus position, and an image height represented by the variables i, z, f, and y are assumed to be integrals. A variable c ($0 \leq c < 2$) represents the color of light to be corrected (processed color). The processed color is either of the two colors, R and B, and it is assumed that the variable c represents R (red) when it is "0" whereas representing B (blue) when it is "1".

First of all, the magnification chromatic aberration correction data table 240 shown in FIG. 5 can be roughly divided into portions corresponding to the processed colors, R and B, represented by the variable c. In one of the divided portions for the R processed color, a two-dimensional table that stores a plurality of correction data 241 is provided. The number of correction data 241 is (ni×nz) determined in correspondence with the matrix (combination) of the aperture value i and the zoom position z.

The correction data 241 in the two-dimensional table described above corresponds to a single focus position. The two-dimensional table is provided for each of the focus positions f "0" to "nf−1, of two-dimensional tables in total, each of which stores correction data 241 for the corresponding focus position f, as shown in FIG. 5. A three-dimensional table that stores correction data 241 corresponding to combinations of the aperture value i, the zoom position z, and the focus position f is thus provided.

The three-dimensional table described above corresponds to a single image height y. The three-dimensional table is provided for each of the image heights y "0" to "ny−1, ny three-dimensional tables in total, each of which stores correction data 241 for the corresponding image height y, as shown in FIG. 5. A four-dimensional table that stores correction data 241 corresponding to combinations of the aperture value i, the zoom position z, the focus position f, and the image height y is thus provided. The four-dimensional table is provided also for the processed color B (c=1).

As described above, the magnification chromatic aberration correction data table 240 stores correction data 241 determined in correspondence with each combination of the aperture value i, the zoom position z, the focus position f, the image height y, and the processed color c. That is, the magnification chromatic aberration correction data table 240 has a structure of a five-dimensional table. The number of correction data 241 that form the magnification chromatic aberration correction data table 240 is therefore (ni×nz×nf×ny×nc). The structure of the magnification chromatic aberration correction data table 240 indicates that the chromatic separation level due to chromatic aberration of magnification depends on the following elements: the aperture, the zoom position, the focus position, and other optical system conditions, the image height, and the color of light. The aperture value i, the zoom position z, the focus position f, the image height y, and the processed color c, which are related to correction data 241, are examples of the aberration variation conditions set forth in the appended claims.

The greatest image height "yn−1" in the magnification chromatic aberration correction data table 240 in the first embodiment of the present disclosure is a 100% image height or corresponds to a vertex of the image area 300 with respect to the image center C in the image area 300, which means that if there is a guarantee that the optical lens section 101 is so attached to the video camcorder 100 that the image center C coincides with the aberration center Q as shown in FIG. 3A, the center position discrepancy data table 250, which will be described later, is unnecessary and only the magnification chromatic aberration correction data table 240 can be used to correct chromatic aberration of magnification.

[Exemplary Method for Acquiring Correction Data in Magnification Chromatic Aberration Correction Data Table]

An exemplary method for acquiring correction data 241 in the magnification chromatic aberration correction data table 240 will next be described. The characteristics of a lens used in the optical lens section 101 are known, for example, which means that the lens characteristics including change in the chromatic separation level due to chromatic aberration of magnification with the image height, for example, shown in FIG. 3A are known. It is therefore possible to determine correction data 241 that form the magnification chromatic aberration correction data table 240 by performing a simulation based on the lens characteristics. More specifically, correction data 241 for R light can be determined as follows: The chromatic separation level of R light with respect to G light is determined by performing a simulation for R light and G light under a condition obtained by combining the following parameters: a certain aperture value i, zoom position z, focus position f, and image height y. A correction level that allows the thus determined chromatic separation level to be canceled so that the position of R light coincides with the position of G light is then calculated. The thus calculated correction level is used as the correction data 241. The simulation described above is performed under all the other conditions obtained by combining the parameters to determine all correction data 241 for R light. The same simulation for B light and G light is performed under each condition obtained by combining the parameters to determine the chromatic separation level of B light with respect to G light. Correction data 241 for B light are thus determined.

The amount of chromatic separation due to chromatic aberration of magnification other than due to individual product variation is determined in accordance only with the characteristics of the lens itself. The magnification chromatic aberration correction data table 240 formed of correction data 241 determined by performing the simulation as described above can be common, for example, to each product of the video camcorder 100.

Chromatic aberration of magnification, from which not only R light and B light but also G light suffer, may be, for example, so corrected that the focus positions of RGB light deviate from one another by the same amount. To this end, in the embodiments of present disclosure, chromatic aberration of magnification is so corrected that G light is used as a reference and the remaining R light and B light are focused where G light is focused. To this send, before determining correction data 241, the amounts of chromatic separation of R light and B light with respect to G light are determined in the embodiments of the present disclosure.

The "correction level" used herein is an "aberration correction level" necessary to eliminate chromatic separation, and the unit of the "correction level" is a ratio, a pixel width, a value relative to the image area size, or any other suitable value. Further, the chromatic separation level used herein is the amount of chromatic separation resulting from aberration and refers to a "produced aberration level." The unit of the chromatic separation level is a ratio, a pixel width, or a value relative to the image area size.

In the above description, the chromatic separation level is first determined, and correction data 241 as the correction level is then determined based on the thus determined chromatic separation level. Alternatively, the chromatic separation level may be directly stored as correction data 241. In this case, the magnification chromatic aberration correction level calculating section 213 may first convert the chromatic separation level stored as correction data 241 into a correction level and then calculate a correction level necessary in an actual process based on the converted correction level. Specifically, when the unit is, for example, a ratio, the relationship between a correction level and a chromatic separation level is expressed as (correction level=1/chromatic separation level). When the unit is a pixel width or a value relative to the image area size, the relationship between a correction level and a chromatic separation level is expressed as (correction level=−chromatic separation level). In either case, the two relationships described above are simple, and the conversion between a chromatic separation level and a correction level can be readily performed in a significantly small amount of computation.

[Exemplary Structure of Center Position Discrepancy Data Table]

Figure 6:
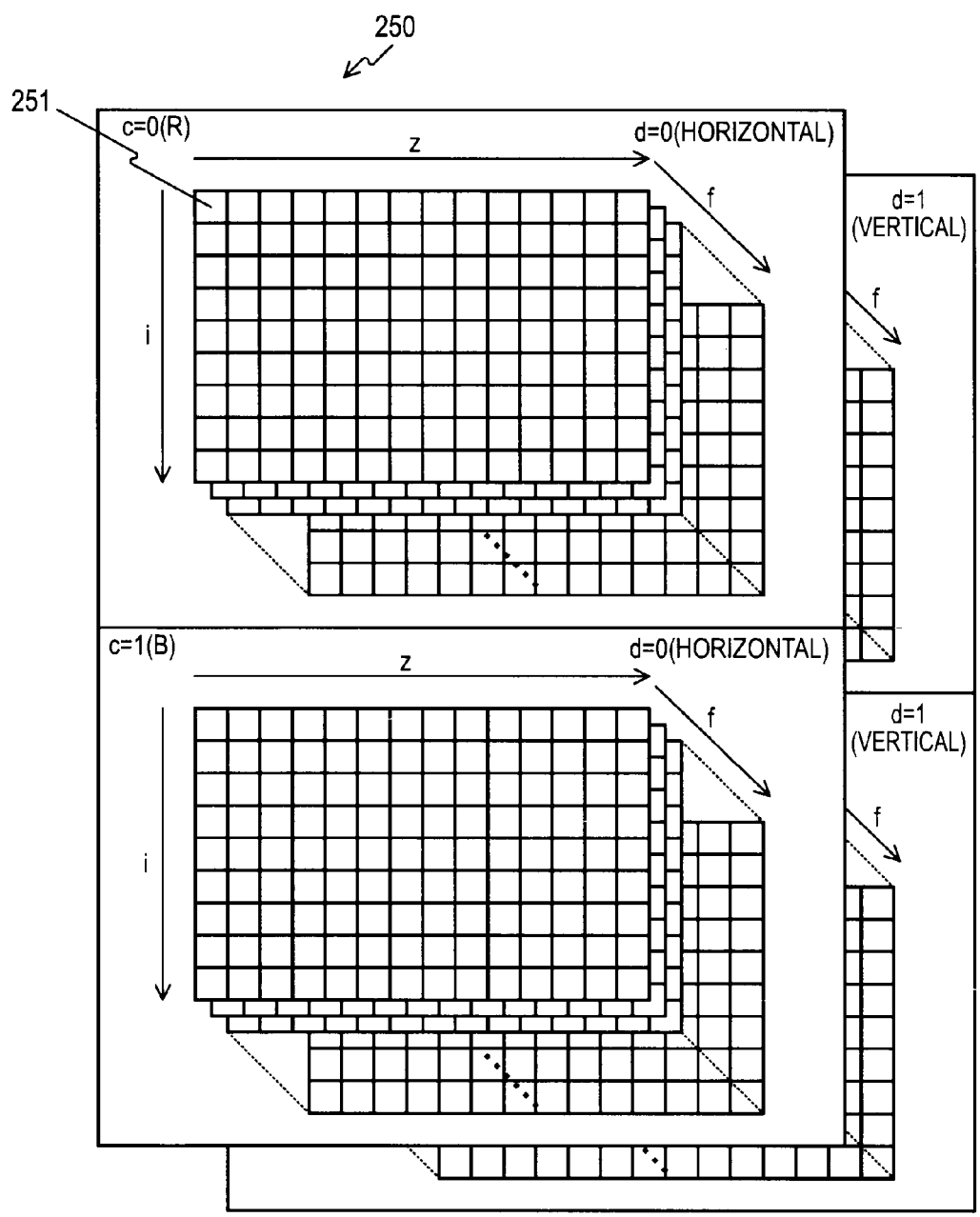
FIG. 6 shows an exemplary structure of a center position discrepancy data table.

FIG. 6 shows an exemplary structure of the center position discrepancy data table 250. The center position discrepancy data table 250 stores center position discrepancy data 251 for each combination of the following parameters: the aperture value i, the zoom position z, the focus position f, the processed color c, and a discrepancy direction component d, as shown in FIG. 6. That is, the center position discrepancy data table 250 has a structure of a five-dimensional table.

The position of the aberration center Q in the image area changes with the conditions of the optical system: the aperture, the zoom position, and the focus position. The position of the aberration center Q in the image area also changes with the color of light. As a result, the center position discrepancy, which is the discrepancy between the image center C and the aberration center Q, also changes with the following conditions: the aperture, the zoom position, the focus position, and the color of light. The center position discrepancy data table 250 therefore has center position discrepancy data 251 for each of the following parameters: the aperture value i, the zoom position z, the focus position f, and the processed color c, as described above. The aperture value i, the zoom position z, the focus position f, the image height y, and the processed color c, which are related to center position discrepancy data 251, are examples of the aberration variation conditions set forth in the appended claims.

The center position discrepancy can be handled in the form of a vector having a horizontal discrepancy component and a vertical discrepancy component. The center position discrepancy data table 250 therefore has a horizontal discrepancy direction component d and a vertical discrepancy direction component d as parameters.

Some of the combinations of the parameters that form the magnification chromatic aberration correction data table 240 and the center position discrepancy data table 250 shown in FIGS. 5 and 6 may be omitted. Specifically, when a single focal length lens is used, in which case the zoom position z is fixed, the zoom position z is not necessarily used as one of the combined parameters.

Further, the lens control information that forms the magnification chromatic aberration correction data table 240 and the center position discrepancy data table 250 is not limited to the one described above. In the above description, the lens control information includes the aperture, the zoom position, and the focus position. These parameters can be considered to represent the settings of movable portions in the optical lens section 101 (FIG. 1). For example, when the optical lens section 101 includes a movable portion other than the aperture, the zoom position, and the focus position, a parameter representing information on the setting of this movable portion may also be combined. Further, the lens control information does not necessarily include all the aperture, the zoom position, and the focus position, but some of them may be omitted as appropriate in accordance with necessary correction precision, the structure of the optical lens section 101, and other factors. For example, when the optical lens section 101 is a deep-focus lens, the focus position may be omitted.

[Exemplary Method for Creating Center Position Discrepancy Data Table]

An exemplary method for creating the center position discrepancy data table 250 will be described. The discrepancy between the image center C and the aberration center Q results, for example, from an error associated with imaging optical system assembling operation and hence depends on individual product variation. It is therefore necessary to create the center position discrepancy data table 250 for each individual product, for example, in a manufacturing step.

An exemplary procedure of creating the center position discrepancy data table 250 will be described with reference to the flowchart in FIG. 7.

Before creating the center position discrepancy data table 250, predetermined numbers of values of the aperture value i, the zoom position z, and the focus position f are determined in advance as representative values. Let the predetermined numbers be mi, mz, and mf. The representative mi aperture values i, mz zoom positions z, and mf focus positions are selected from the ni aperture values i, the nz zoom positions z, and the of focus positions, which specify the center position discrepancy data 251.

The video camcorder 100 under test is then used to capture a chart image (step S901). The chart image in this case is an image having a predetermined pattern provided to detect the position of the aberration center Q. A specific example of the chart image will be described below. The chart image is captured in step S901 with the optical lens section 101 set based on a pattern obtained by combining values selected from the representative mi aperture values i, mz zoom positions z, and mf focus positions f.

Figure 8A:
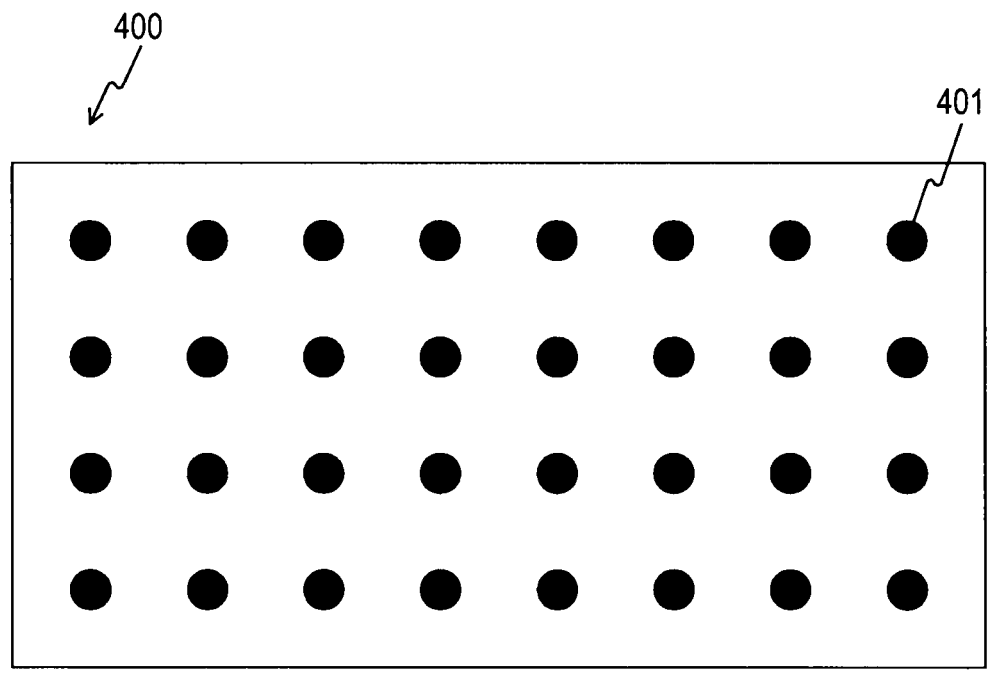
FIGS. 8A and 8B show examples of a chart image used to create the center position discrepancy data table.
Figure 8B:
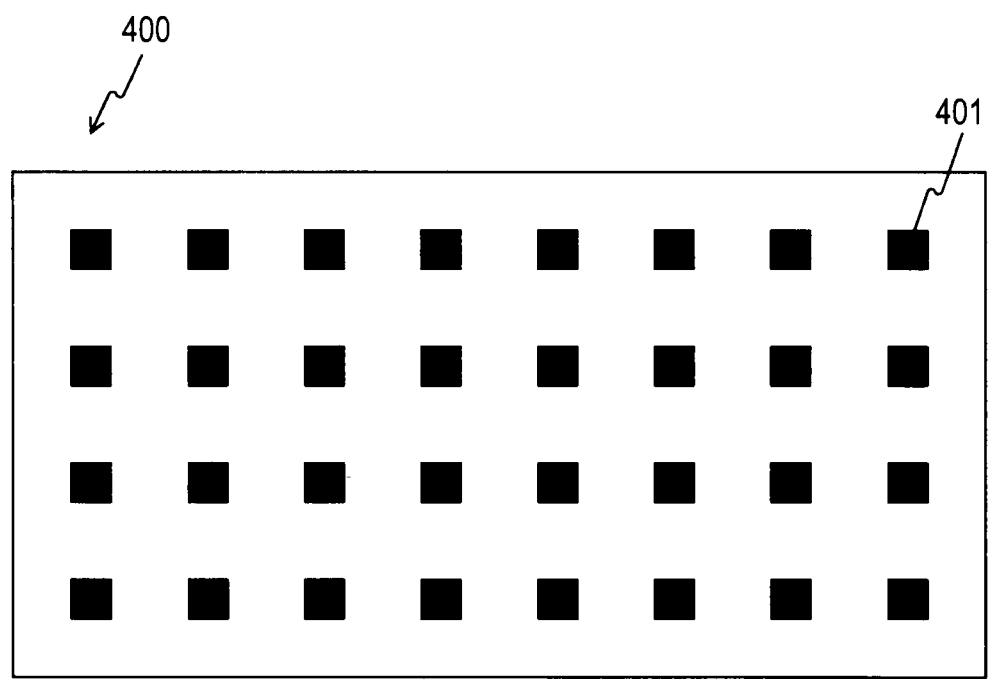

FIGS. 8A and 8B show examples of the chart image 400 used in the imaging process in step S901. First, FIG. 8A shows an example of the chart image 400 having a pattern in which black circular figure portions 401 are arranged in predetermined numbers of rows and columns against a white background. FIG. 8B shows another example of the chart image 400 having a pattern in which the circular figure portions 401 are replaced with square ones.

As described above, the chart image 400 is formed by arranging the figure portions 401 having a predetermined shape, such as a circle and a square, against a plain background. It is noted that the shape of each of the figure portions 401 is not limited to circular or square. The chart images 400 shown in FIGS. 8A and 8B have the white background and the black figure portions 401, but instead the background may be black and the figure portions 401 may be white. Further, as long as the figure portions 401 have the same color, the background and the figure portions 401 may be colored in other ways. Moreover, the figure portions 401 may not necessarily be arranged across the image area of the chart image 400, but at least two figure portions 401 are enough to detect the aberration center Q. It is, however, noted that the aberration center Q can be detected with high precision when at least a certain number of figure portions 401 are arranged. The figure portions 401 may not necessarily be arranged in rows and columns but may be arranged in other patterns.

Figure 9:
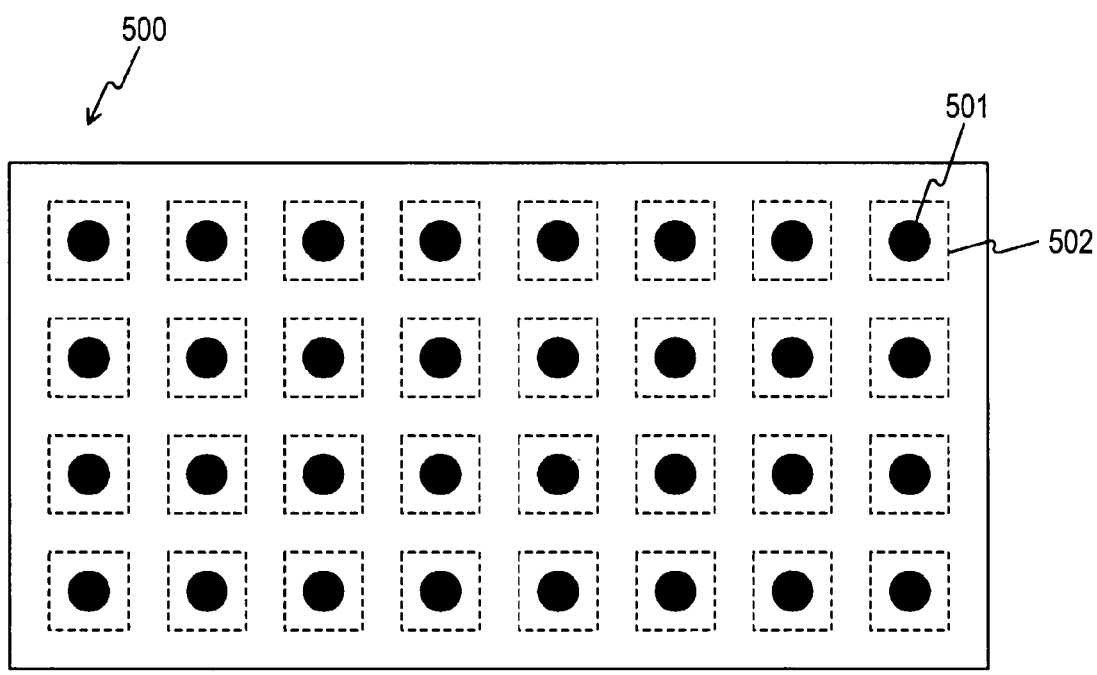
FIG. 9 diagrammatically shows a process of extracting block-shaped image regions corresponding to figure image portions in a capture chart image.

Subsequently, based on the image data obtained by capturing the chart image 400 in the step S901 described above, block-shaped regions containing the figure portions 401 are extracted (step S902). To extract the regions, for example, a known pattern recognition technique can be used. FIG. 9 diagrammatically shows the process in step S902 and shows a captured chart image 500, which is an image obtained by capturing the chart image 400. The captured chart image 500 has figure image portions 501 corresponding to the captured circular figure portions 401 and hence having the same circular shape. In the example shown in FIG. 9, square blocks 502 containing the figure image portions 501 are set as indicated by the broken lines, and the image regions in the blocks 502 are extracted from the captured chart image 500.

The center of gravity of the figure image portion 501 in each of the blocks 502 extracted in step S902 described above is then detected for each of the colors R, G, and B (step S903). Image data is formed of information on the positions of the pixels that form an image and the levels of RGB pixels in their positions. In view of this fact, the figure image portion 501 is separated from the background in each of the blocks 502, for example, by setting level thresholds, and then the center of gravity of the figure image portion 501 is calculated in each of the RGB planes. For example, the center of gravity in the R plane (Xr, Yr) can be determined by using an R level mr(x, y) for each of the coordinates of the pixels that forms the figure portion 501 as follows.

$$Xr = \frac{\sum_x \sum_y mr(x, y) \times x}{\sum_x \sum_y mr(x, y)} \quad Yr = \frac{\sum_x \sum_y mr(x, y) \times y}{\sum_x \sum_y mr(x, y)}$$

That is, the coordinates of the center of gravity of the figure image portion 501 is determined by determining the position of the center of gravity in the x (horizontal) and y (vertical) directions. The above equations are also applied to G and B to determine the centers of gravity in the G and B planes.

The thus determined center of gravity of each of the figure image portions 501 as described above is then used to calculate an aberration vector for R with respect to G and an aberration vector for B with respect to G (step S904). Now, let (Xr, Yr), (Xg, Yg), and (Xb, Yb) be the coordinates of the centers of gravity in a single block determined in step S903 described above. Based on the coordinates defined as described above, the aberration vector for R with respect to G can be determined to be (Xr−Xg, Yr−Yg). Similarly, the aberration vector for B with respect to G can be determined to be (Xb−Xg, Yb−Yg).

Figure 10:
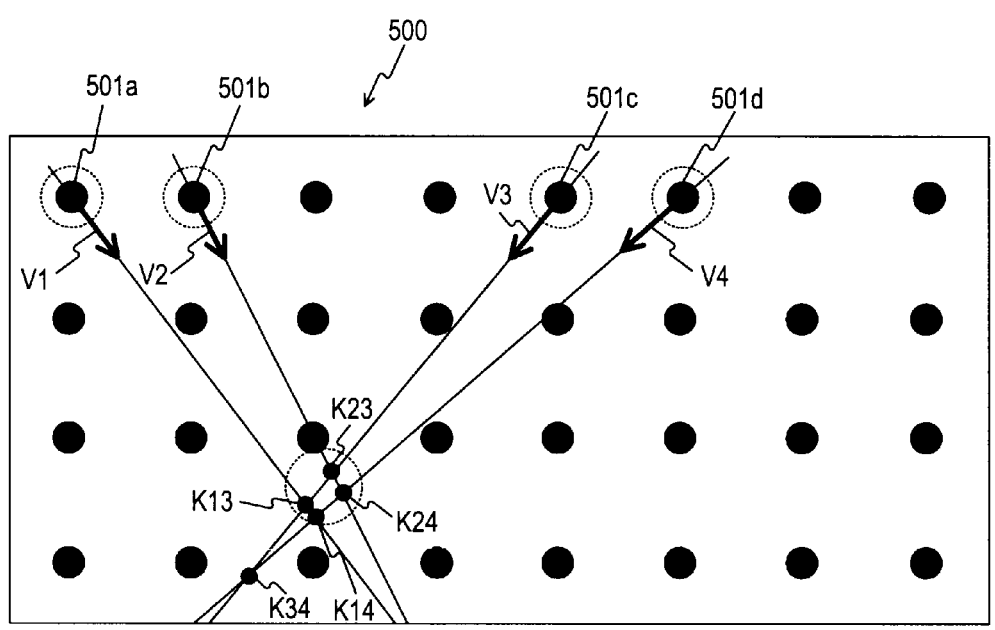
FIG. 10 diagrammatically shows a process of determining an intersection of aberration vectors determined for some sets of the figure image portions.

The intersection of directed lines according to the aberration vectors determined in step S904 described above is then determined (step S905). An example of how to determine the intersection will be described with reference FIG. 10. FIG. 10 shows the captured chart image 500 in which the circular figure image portions 501 are arranged. Now, look at four figure image portions 501a, 501c, 501c, and 501d arbitrarily selected from the figure image portions 501 in the captured chart image 500. Let V1, V2, V3, and V4 be the aberration vectors associated with the figure portions 501a, 501c, 501c, and 501d determined in step S904. The aberration vectors V1, V2, V3, and V4 are directed as indicated by the arrows in FIG. 10. The aberration vectors V1, V2, V3, and V4 shown in FIG. 10 are aberration vectors for R with respect to G in this description.

Each aberration vector for R with respect to G represents the chromatic separation level for R with respect to G and the two-dimensional direction of the chromatic separation resulting from chromatic aberration of magnification. The chromatic aberration of magnification can be expressed by a vector starting at the aberration center Q and directed in the radial direction. When the aberration vector is taken as a directed line starting at the corresponding figure image portion 501, the intersection of the directed lines corresponding to aberration vectors coincides with the aberration center Q.

The directed line corresponding to the aberration vector V1 starting at the figure image portion 501a and the directed line corresponding to the aberration vector V3 starting at the figure image portion 501c determine an intersection K13, as shown in FIG. 10. Further, the directed line corresponding to the aberration vector V1 starting at the figure image portion 501a and the directed line corresponding to the aberration vector V4 starting at the figure image portion 501d determine an intersection K14. The directed line corresponding to the aberration vector V2 starting at the figure image portion 501b and the directed line corresponding to the aberration vector V3 starting at the figure image portion 501c determine an intersection K23. The directed line corresponding to the aberration vector V2 starting at the figure image portion 501b and the directed line corresponding to the aberration vector V4 starting at the figure image portion 501d determine an intersection K24. The directed line corresponding to the aberration vector V3 starting at the figure image 501c and the directed line corresponding to the aberration vector V4 starting at the figure image portion 501d determine an intersection K34.

Now, express a straight line passing through (x1, y1) and (x2, y2) and a straight line passing through (x3, y3) and (x4, y4) as follows.

$y = a1 \times x + b1$ $y = a2 \times x + b2$

The coefficients a1, b1, a2, and b2 are expressed as follows.

$a1 = (y1 - y2)/(x1 - x2)$ $b1 = y1 - a1 \times x1$ $a2 = (y3 - y4)/(x3 - x4)$ $b2 = y3 - a2 \times x3$ The intersection (x12, y12) of the two straight lines can be determined as follows.

$x12 = (b2 - b1)/(a1 - a2)$ $y12 = a1 \times x12 + b1$

In the embodiments of the present disclosure, the intersection is determined by using the above equations for each combination of, for example, two figure portions 401. The intersections are similarly determined for the aberration vectors for B with respect to G.

A plurality of intersections determined as described above should all ideally be positioned at a single point corresponding to the aberration center Q. In practice, however, the intersections spread in a certain range due to noise in a captured image and errors, as shown in FIG. 10. In this case, the coordinates of the aberration center is determined by using the plurality of calculated intersections (step S906). Among some conceivable determination methods, the plurality of calculated intersections may be averaged. Alternatively, a histogram of the coordinates of the calculated intersections is created, and the most frequent coordinates in the histogram is determined as the coordinates of the aberration center. As will be understood from the description having been made, the coordinates of intersections are determined for each of the R and B colors. The coordinates of the aberration center are therefore determined for each of the R and B colors.

In the step S906 described above, the coordinates of the aberration center Q are determined. Each center position discrepancy data 251 stored in the center position discrepancy data table 250 needs to present the discrepancy between the image center C and the aberration center Q instead of the coordinates themselves of the aberration center Q. The center position discrepancy is therefore determined in the following step based on the determined coordinates of the aberration center Q (S907). To this end, for example, the coordinates of the center of the captured chart image 400 may be subtracted from the coordinates of the aberration center Q, and the resultant value may be used as the center position discrepancy. The center position discrepancy is also determined for each of the R and B colors.

The steps S901 to S907 are repeatedly carried out until the center position discrepancy is calculated for all patterns obtained by combining the representative mi aperture values i, mz zoom positions z, and mf focus positions f (step S908). That is, when there remains a combination pattern for which the center position discrepancy has not been determined, the processes in steps S901 to S907 are repeatedly carried out for a pattern obtained by combining a new representative aperture value i, zoom position z, and focus position f. When the center position discrepancies corresponding to all patterns obtained by combining the representative mi aperture values i, mz zoom positions z, and mf focus positions f are eventually determined (step S904), the control proceed to the following step.

The representative mi aperture values i, mz zoom positions z, and mf focus positions f are those selected from the ni aperture values i, nz zoom positions z, and nf focus positions f in the center position discrepancy data table 250, as described above. At the point when the process in the step S908 is completed, no center position discrepancy corresponding to a pattern obtained by combining an aperture value i, a zoom position z, and a focus position f other than the representative ones has been determined. The center position discrepancies corresponding to patterns obtained by combining aperture values i, zoom positions z, and focus positions f other than the representative ones are then calculated (step S909). To this end, among the center position discrepancies corresponding to the patterns obtained by combining the representative aperture values i, zoom positions z, and focus positions f calculated in step S905, the center position discrepancies corresponding to necessary combination patterns may be used to perform predetermined interpolation.

When the process in step S909 described above is completed, the center position discrepancies corresponding to the patterns obtained by combining the ni aperture values i, the nz zoom positions z, and the nf focus positions f have been determined. Subsequently, the thus determined center position discrepancies are stored as the center position discrepancy data 251 to create the center position discrepancy data table 250 (step S910).

In the present embodiment, the center position discrepancy data table 250 is created in advance and stored in the video camcorder 100. In this way, the user does not need to do a cumbersome task, such as operating the zoom lens to detect the position of the aberration center, unlike in related art.

[Exemplary Processes Carried Out by Magnification Chromatic Aberration Corrector]

Figure 11:
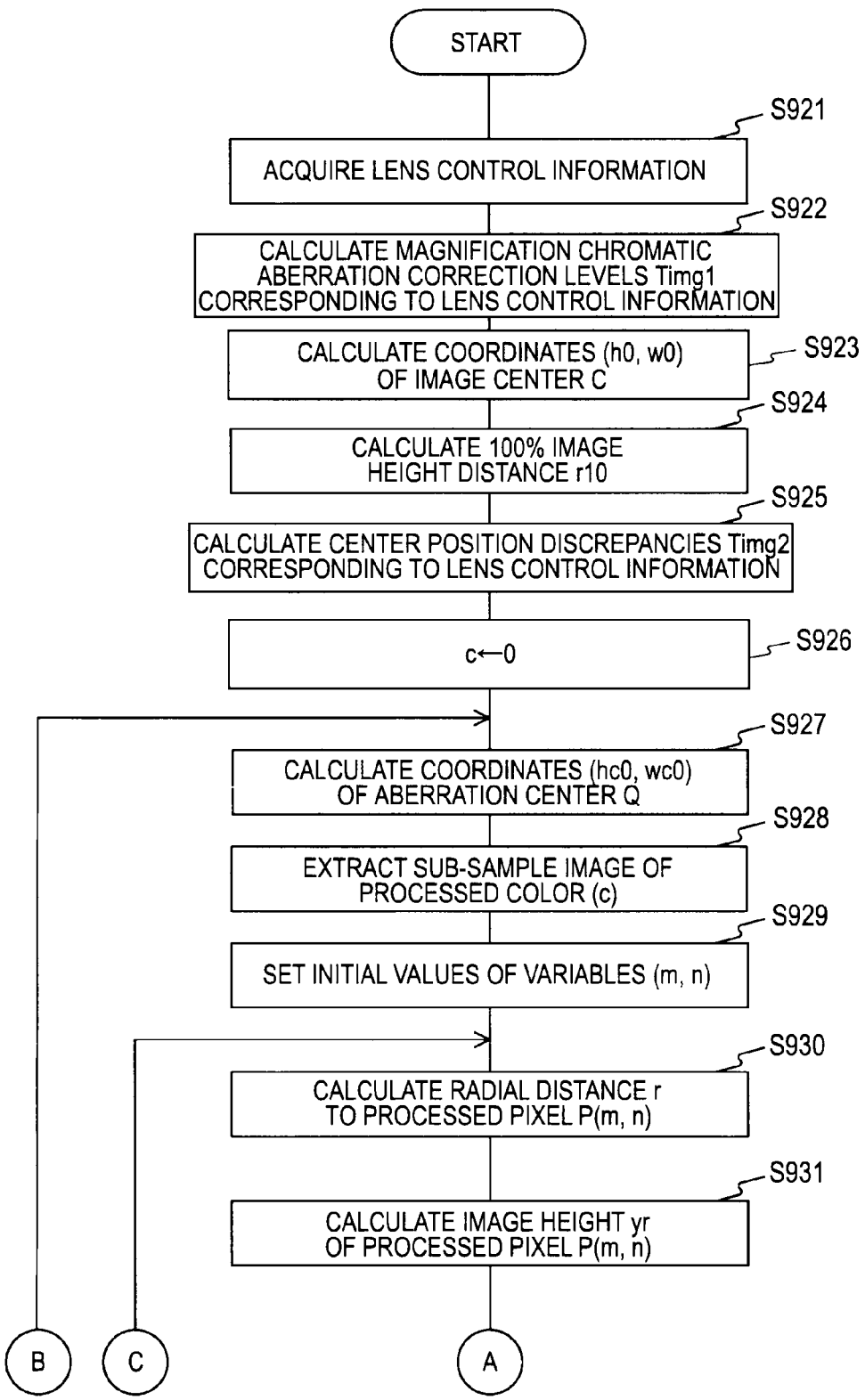
FIG. 11 shows exemplary processes carried out by a magnification chromatic aberration corrector in the first embodiment of the present disclosure.
Figure 12:
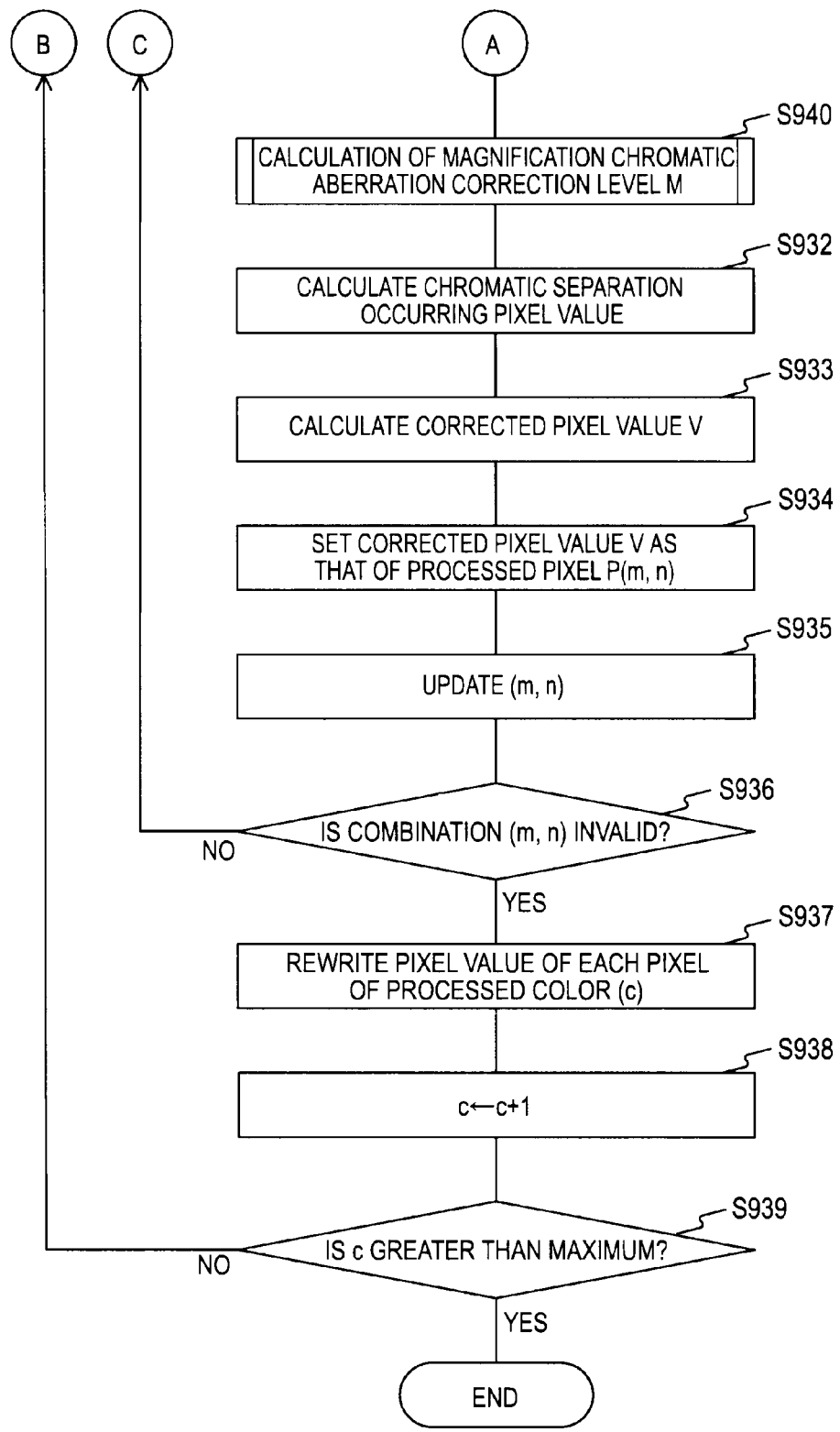
FIG. 12 shows exemplary processes carried out by the magnification chromatic aberration corrector in the first embodiment of the present disclosure.

The flowcharts in FIGS. 11 and 12 show exemplary processes of correcting chromatic aberration of magnification carried out by the magnification chromatic aberration corrector 210 shown in FIG. 4. The processes in the steps shown in FIGS. 11 and 12 are carried out as appropriate by an appropriate component that forms the magnification chromatic aberration corrector 210. The processes in the steps shown in FIGS. 11 and 12 are carried out, for example, by using the CPU 111 or a DSP (digital signal processor) to execute a program or by using hardware.

First, the magnification chromatic aberration correction level calculating section 213 and the aberration center calculating section 214 acquire lens control information from the camera controller 102 (step S921). The lens control information includes the aperture value, the zoom position, and the focus position based on which the optical lens section 101 is currently set, as described above.

The magnification chromatic aberration correction level calculating section 213 then calculates magnification chromatic aberration correction levels Timg1 corresponding to the lens control information acquired in step S921 described above (step S922). The magnification chromatic aberration correction level Timg1 can, for example, be calculated as follows.

Before calculating the magnification chromatic aberration correction level Timg1, let $p_{i1}$, $p_{z1}$, and $p_{f1}$ be the aperture value, the zoom position, and the focus position, which are those that form the lens control information acquired in the step S921 described above. Each of the aperture value $p_{i1}$, the zoom position $p_{z1}$, and the focus position $p_{f1}$ is assumed to be formed of an integer part (i) and a fractional part (f) having a predetermined number of digits and expressed as follows.

$$p_{i1} = p_{ii1} + p_{if1}$$

$$p_{z1} = p_{zi1} + p_{zf1}$$

$$p_{f1} = p_{fi1} + p_{ff1}$$

The magnification chromatic aberration correction level calculating section 213 selects arbitrary correction data 241 from the magnification chromatic aberration correction data table 240 and specifies it as follows: The correction data 241 is specified by using the combination of an aperture value i, a zoom position z, a focus position f, an image height y, and a processed color c, all of which are integers. This operation corresponds to the operation described above of storing correction data 241 corresponding to the combination of an aperture value i, a zoom position z, a focus position f, a image height y, and a processed color c, all of which are integers. Let Tca1 [i] [z] [f] [y] [c] be the thus specified correction data 241.

The magnification chromatic aberration correction level calculating section 213 then accesses all correction data 241 specified by Tca1 [$p_{ii1}$] [$p_{zi1}$] [$p_{fi1}$] [y] [c] and reads them from the magnification chromatic aberration correction data table 240. In this process, correction data 241 for all image heights y and the processed colors c stored in the magnification chromatic aberration correction data table 240 are accessed and read. The number of correction data 241 specified by Tca1 [$p_{ii1}$] [$p_{zi1}$] [$p_{fi1}$] [y] [c] is therefore expressed by (ny×nc).

The magnification chromatic aberration correction level calculating section 213 further accesses correction data 241 specified by Tca1 [$p_{ii1}$+1] [$p_{zi1}$+1] [$p_{fi1}$+1] [y] [c] and reads them from the magnification chromatic aberration correction data table 240. The number of correction data 241 specified by Tca1 [$p_{ii1}$+1] [$p_{zi1}$+1] [$p_{fi1}$+1] [y] [c] is also expressed by (ny×nc).

The magnification chromatic aberration correction level calculating section 213 then calculates magnification chromatic aberration correction levels Timg1 [y] [c]. To this end, the correction data 241 indicated by Tca1 [$p_{ii1}$] [$p_{ii1}$] [$p_{fi1}$] [y]

[c] and Tca1 [$p_{ii1}$+1] [$p_{zi1}$+1] [$p_{fi1}$+1] [y] [c] described above are used to perform the following computation $$T_{img1}[y][c] = \sum_{i=0}^{1}\sum_{j=0}^{1}\sum_{k=0}^{1} T_{ca1}[p_{ii1}+i][p_{zi1}+j][p_{fi1}+k][y][c] \cdot \{(1-i)+(-1)^{i+1} \cdot p_{if1}\} \cdot \{(1-j)+(-1)^{j+1} \cdot p_{zf1}\} \cdot \{(1-k)+(-1)^{k+1} \cdot p_{ff1}\}$$

That is, the integer parts of the aperture value $p_{i1}$, the zoom position $p_{z1}$, and the focus position $p_{f1}$ are used to acquire correction data 241 based on which the interpolation is performed. The acquired correction data 241 are Tca1 [$p_{ii1}$] [$p_{zi1}$] [$p_{fi1}$] [y] [c] and Tca1 [$p_{ii1}$+1] [$p_{zi1}$+1] [$p_{fi1}$+1] [y] [c]. The correction data 241 based on which the interpolation is performed and the fractional parts $p_{if1}$, $p_{zf1}$, and $p_{ff1}$ of the aperture value $p_{i1}$, the zoom position $p_{z1}$, and the focus position $p_{f1}$ are used to perform three-dimensional linear interpolation. The thus determined interpolated values are the magnification chromatic aberration correction levels Timg1 [y] [c]. The number of magnification chromatic aberration correction levels Timg1 [y] [c] is also (ny×nc). The magnification chromatic aberration correction levels Timg1 [y] [c] are determined based on linear interpolation in the above description, but any other suitable interpolation or calculation method may be used.

The aberration center calculating section 214 subsequently calculates the coordinates (h0, w0) of the image center C (step S923). The coordinates of the image center C represent the coordinates of the pixel at the center of an image formed in accordance with the pixel layout contained in the image signal to be corrected, that is, the coordinates of the pixel positioned at the image center c shown in FIGS. 3A and 3B. Based on the coordinates of the image center C, the coordinates of the aberration center Q, which will be described later, is determined. A known example of the image layout in this case is typically a Bayer layout.

The simplest example of the calculation of the coordinates (h0, w0) of the image center C is C (h/4, w/4), where h and w represent the vertical and horizontal sizes of an image area formed by all the color pixels that form the image signal to be corrected.

In practice, however, there can be a case where the lens optical axis is shifted with respect to the imaging surface of the imaging device, for example, depending on the conditions of designing the optical lens section 101. It is preferable in this case to calculate the coordinates (h0, w0) of the image center C reflecting the amount of shift of the lens optical axis described above. Since the position of the lens optical axis is fixed in this case, the coordinates (h0, w0) of the image center C are, for example, alternatively stored and read as necessary instead of performing the calculation in step S923. There is also a known hand-shake correction function of, for example, physically inclining the lens optical axis. When the video camcorder 100 according to the embodiments of the present disclosure has such a hand-shake correction function, it is preferable to dynamically calculate the coordinates (h0, w0) of the image center C in accordance with the position of the lens optical axis changed in accordance with the hand-shake correction control. In this way, chromatic aberration of magnification can be corrected more precisely irrespective of the change in the position of the lens optical axis caused by the hand-shake correction control.

The image height calculating section 212 subsequently calculates a distance r10 corresponding to a 100% image height (100% image height distance) (step S924). The 100% image height refers to the image height in a position farthest from the center of the image area formed in accordance with the pixel layout contained in the image signal to be corrected. The 100% image height distance r10 corresponds, for example, to the direct distance from the intersection of the diagonals of a rectangular image area to a vertex thereof. It is, however, noted that the 100% image height distance r10 in this description is one defined in a color image area formed only of R or B pixels to be processed in the following steps. For example, when the pixel layout is the Bayer layout, the color image area formed only of R pixels (R image area) has a longitudinal length of h/2 and a transverse length of w/2. Similarly, the color image area formed only of B pixels (B image area) also has a longitudinal length of h/2 and a transverse length of w/2. The 100% image height distance in each of the R and B image areas is expressed as follows.

$$r10 = \mathrm{sqrt}((h/4)^2 + (w/4)^2)$$

In the above equation, sqrt represents square root operation.

A center position discrepancy Timg2 is subsequently calculated (step S925). To this end, the aberration center calculating section 214 first uses an aperture value $p_{i2}$, a zoom position $p_{z2}$, and a focus position $p_{f2}$ acquired in step S921 described above to acquire necessary center position discrepancy data 251. That is, all center position discrepancy data 251 specified by Tca2 [$p_{ii2}$] [$p_{zi2}$] [$p_{fi2}$] [d] [c] are read and acquired from the center position discrepancy data table 250. Further, all center position discrepancy data 251 specified by Tca2 [$p_{ii2}$+1] [$p_{zi2}$+1] [$p_{fi2}$+1] [d] [c] are read and acquired. The number of center position discrepancy data 251 acquired based on Tca2 [$p_{ii2}$] [$p_{zi2}$] [$p_{fi2}$] [d] [c] is four (md×mc). Similarly, the number of center position discrepancy data 251 acquired based on Tca2 [$p_{ii2}$+1] [$p_{zi2}$+1] [$p_{fi2}$+1] [d] [c] is also four.

The aberration center calculating section 214 then uses the thus acquired Tca2 [$p_{ii2}$] [$p_{zi2}$] [$p_{fi2}$] [d] [c] and Tca2 [$p_{ii2}$+1] [$p_{zi2}$+1] [$p_{fi2}$+1] [d] [c] to perform, for example, the following computation. The center position discrepancies Timg2 [d] [c] are thus calculated.

$$T_{img2}[d][c] = \sum_{i=0}^{1}\sum_{j=0}^{1}\sum_{k=0}^{1} T_{ca2}[p_{ii2}+i][p_{zi2}+j][p_{fi2}+k][d][c] \cdot \{(1-i)+(-1)^{i+1} \cdot p_{if2}\} \cdot \{(1-j)+(-1)^{j+1} \cdot p_{zf2}\} \cdot \{(1-k)+(-1)^{k+1} \cdot p_{ff2}\}$$

That is, in the above equation, the center position discrepancies Timg2 [d] [c] are determined by using three-dimensional linear interpolation, as in the case of the magnification chromatic aberration correction levels Timg1.

The color pixel selector 211 then substitutes, for example, "0" into the variable c, which represents the processed color (step S926). In the embodiments of the present disclosure, the processed color indicted by the variable c having "0" is R (red), whereas the processed color indicated by the variable c having "1" is B (blue).

The aberration center calculating section 214 then determines the coordinates (hc0, wc0) of the aberration center Q for the processed color (step S927). In step S927, the coordinates (h0, w0) of the image center C calculated in step S923 and the center position discrepancies Timg2 [d] [c] for the processed color represented by the current variable c are used. Now, let sft_x and sft_y be horizontal and vertical center position discrepancy components of the center position discrepancies Timg2 [d] [c]. The coordinates (hc0, wc0) of the aberration center Q can be determined as follows by using sft_x and sft_y.

$$hc0 = h0 + sft\_x$$

$$wc0 = w0 + sft\_y$$

The color pixel selector 211 then extracts a sub-sample image of the processed color indicated by the current variable c from the image signal to be corrected (step S928). That is, an image signal formed only of the pixels of the processed color indicated by the variable c is extracted.

The color pixel selector 211 then sets initial values of a set of variables (m, n) representing the coordinates of a processed pixel P among the pixels that form the sub-sample image of the processed color (step S929). Data on the coordinates (m, n) of the processed pixel P are delivered, for example, to the image height calculating section 212.

The image height calculating section 212 calculates the radial distance r from the coordinates of the aberration center Q, which is a reference, to the coordinates (m, n) of the processed pixel P (step S930) and converts the calculated radial distance r into an image height $y_r$ (step S931). First, the radial distance r can be determined by using the coordinates of the processed pixel P(m, n) and the coordinates (hc0, wc0) of the aberration center Q calculated in step S927 as follows.

$$r = \text{sqrt}((m-hc0)^2 + (n-wc0)^2)$$

The image height $y_r$ of the processed pixel P(m, n) can be determined by the following equation. In the equation, "ny−1" is the 100% image height, and r10 represents the 100% image height distance calculated in step S924 described above.

$$y_r = (r/r10) \times (ny-1)$$

The calculation of the image height $y_r$ based on the above equation is also performed with respect to the coordinates of the aberration center Q. Further, the image height $y_r$ is formed of an integer part (i) and a fractional part (f) and is hence expressed as follows.

$$y_r = y_{ri} + y_{rf}$$

Figure 14:
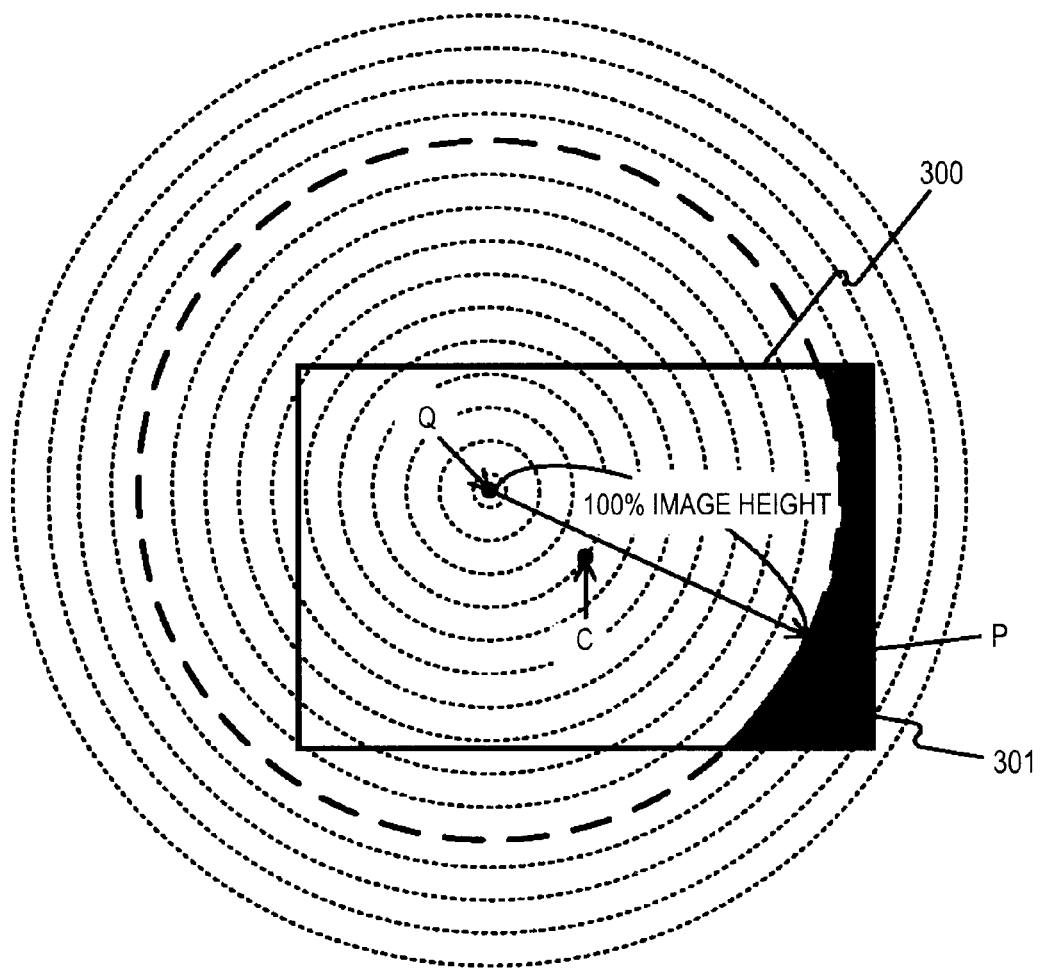
FIG. 14 shows an example of an extra-100% image height region.

The image height $y_r$ of the processed pixel P(m, n) determined in step S930 described above may be greater than the 100% image height in some cases. FIG. 14 shows an example in which the aberration center Q is shifted from the image center C upward and leftward. In this case, the image area 300 has an extra-100% image height region 301 where an image height with respect to the aberration center Q is greater than the 100% image height, as shown in FIG. 14. In the magnification chromatic aberration correction data table 240 according to the first embodiment of the present disclosure, the image height y ranges from "0" to "ny−1" and is the 100% image height at maximum. That is, the magnification chromatic aberration correction data table 240 according to the first embodiment of the present disclosure does not store correction data 241 corresponding to an image height greater than the 100% image height. Any processed pixel P within the extra-100% image height region 301 may not be corrected based on the magnification chromatic aberration correction data table 240 according to the first embodiment of the present disclosure. To address the problem, in the first embodiment, the correction data 241 corresponding to the 100% image height is applied to a processed pixel P at an image height y greater than the 100% image height. In this way, chromatic aberration of magnification at a processed pixel P at an image height greater than the 100% image height can be corrected in an approximate manner.

Subsequent to step S931 shown in FIG. 11, the magnification chromatic aberration correction level calculating section 213 calculates a magnification chromatic aberration correction level M corresponding to the processed pixel P(m, n), as shown in FIG. 12 (step S940). The magnification chromatic aberration correction level calculating section 213 calculates the magnification chromatic aberration correction level M by using the correction data 241 corresponding to the 100% image height when a pixel P at an image height greater than the 100% image height is processed, as described above. The calculation of the magnification chromatic aberration correction level M in step S940 will be described later.

The chromatic separation occurring pixel value calculating section 215 then calculates the pixel value of a chromatic separation occurring pixel (step S932). Before calculating the pixel value of the chromatic separation occurring pixel, the chromatic separation occurring pixel value calculating section 215 first calculates the coordinates of the chromatic separation occurring pixel. To this end, the chromatic separation occurring pixel value calculating section 215 receives the magnification chromatic aberration correction level M calculated in the step S940 described above and then determines the coordinates of the chromatic separation occurring pixel Pd(m1, n1) as follows.

$$m1 = (m - hc0) \times M + hc0$$

$$n1 = (n - wc0) \times M + wc0$$

The chromatic separation occurring pixel value calculating section 215 then calculates the pixel value of the chromatic separation occurring pixel Pd(m1, n1) and outputs the pixel value as a corrected pixel value V (step S933). Each of the coordinates of the chromatic separation occurring pixel Pd(m1, n1) has a fractional part because the magnification chromatic aberration correction level M and the coordinates (hc0, wc0) of the aberration center Q contained in the above equations have fractional parts. The pixel value correcting section 216 calculates the corrected pixel value V, which is the pixel value of the chromatic separation occurring pixel Pd(m1, n1), based on interpolation using the pixel value of a predetermine pixel positioned in the vicinity of the chromatic separation occurring pixel Pd(m1, n1). The pixel value correcting section 216 then sets the calculated corrected pixel value V as the pixel value of the current processed pixel P(m, n) (step S934).

After the processes described above are carried out, the color pixel selector 211 updates the combination of the variables (m, n) representing the processed pixel P (step S935). The processed pixel P is thus changed. The color pixel selector 211 then judges whether or not the current variables (m, n) are a combination of invalid values (step S936). For example, when there remain unprocessed pixels of the processed color corresponding to the current variable c, the variables (m, n) updated in step S935 have a combination of valid values corresponding to any of the unprocessed pixels described above. In contrast, after all the color pixels of the current processed color are processed, the variables (m, n) updated in step S935 have a combination of invalid values corresponding to none of the color pixels of the current processed color. When the judgment in step S936 shows that the variables (m, n) do not have a combination of invalid values, there remain unprocessed color pixels, and the control returns to step S930. On the other hand, when the judgment in step S936 shows that the variables (m, n) have a combination of invalid values, the pixel value correcting section 216 carries out the following process.

That is, when the judgment in step S936 shows that the variables (m, n) have a combination of invalid values, all the pixels of the current processed color has already had the corrected pixel value V. The pixel value correcting section 216 receives a signal carrying the sub-sample image of either of the processed color R or B indicated by the current variable c and then replaces the pixel value of each of the pixels that form the sub-sample image with the corrected pixel value V set for the pixel (step S937). The signal carrying the sub-sample image having thus rewritten pixel values is a signal component having undergone correction of chromatic aberration of magnification and corresponding to R or B in the aberration corrected image signal.

After the process in step S937 described above is completed, the color pixel selector 211 increments the variable c (step S938). When the variable c is changed from "0" to "1" in the process, for example, the processed color is changed from R to B, and the processed color information outputted from the color pixel selector 211 is also changed from a value representing R to a value representing B.

The color pixel selector 211 then judges whether or not the current variable c is greater than its maximum (step S939). When the judgment shows that the current variable c is smaller than the maximum, the control returns to the process in step S927. At this point, the process of correcting chromatic aberration of magnification for R light transitions to a process of correcting chromatic aberration of magnification, for example, for B light. After the process in step S938 is carried out again and the judgment in step S939 shows that the variable c is greater than the maximum, a one-frame image, for example, has undergone the correction of chromatic aberration of magnification. The magnification chromatic aberration corrector 210 then outputs R and B color signals having rewritten pixel values and the G color signal directly outputted from the color pixel selector 211. Each of these RGB color signals is the aberration corrected image signal.

Figure 13:
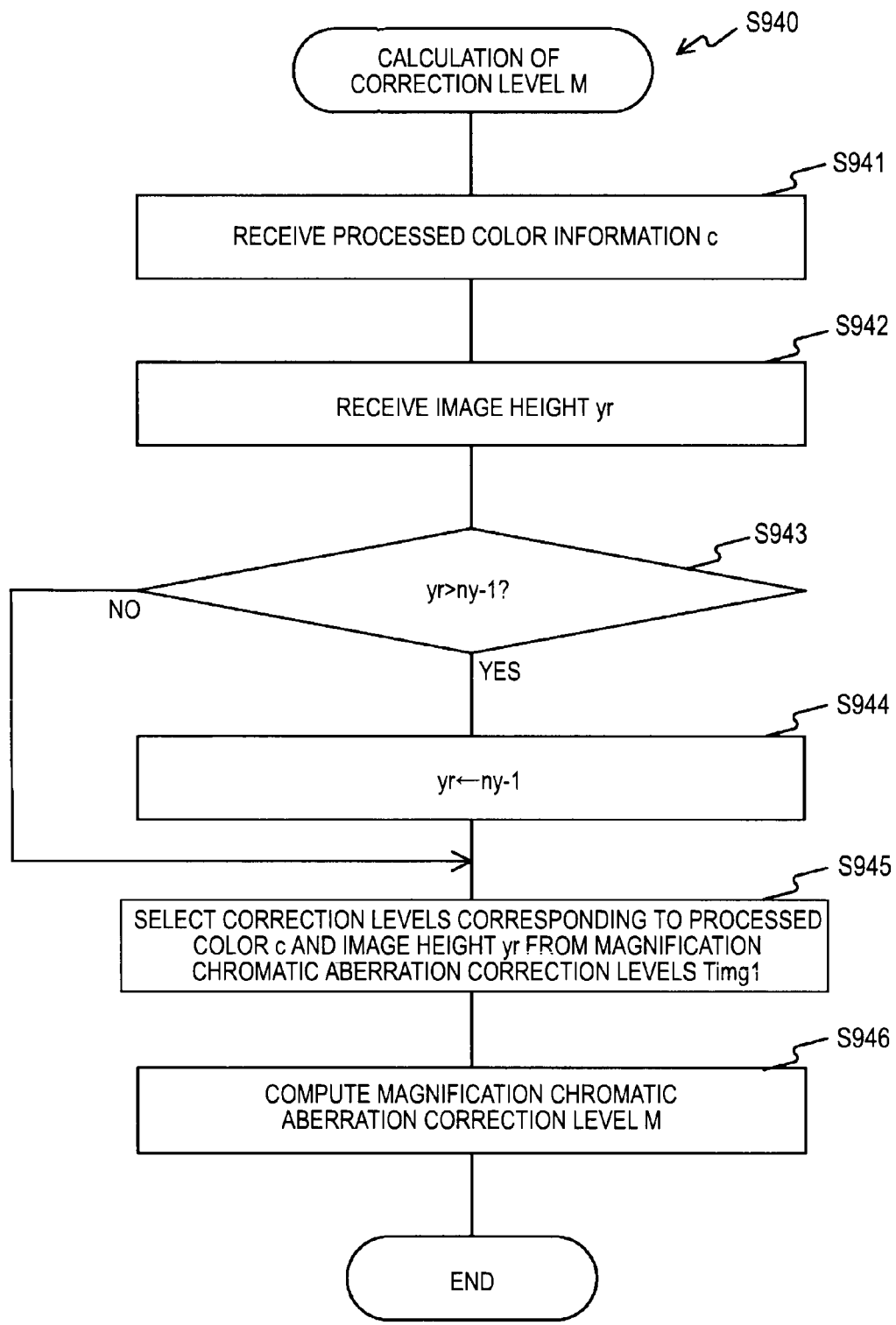
FIG. 13 shows an exemplary procedure of calculating a magnification chromatic aberration correction level in the first embodiment of the present disclosure.

An exemplary procedure of calculating the magnification chromatic aberration correction level M in step S940 shown in FIG. 12 will be described with reference to the flowchart in FIG. 13.

To this end, the magnification chromatic aberration correction level calculating section 213 first receives the processed color indicated by the variable c from the color pixel selector 211 (step S941) and receives the image height $y_r$ calculated in step S931 described above from the image height calculating section 212 (step S942).

The magnification chromatic aberration correction level calculating section 213 then judges whether or not the image height $y_r$ inputted in step S942 is greater than "ny−1," which is the greatest image height y in the magnification chromatic aberration correction data table 240. When the judgment shows that the image height $y_r$ inputted in step S942 is greater than the 100% image height and hence greater than "ny−1," "ny−1" is substituted into the image height $y_r$ (step S944). In this operation, the inputted image height $y_r$, when being greater than the 100% image height, is replaced with "ny−1" corresponding to the 100% image height. On the other hand, when the inputted image height $y_r$ is not greater than the 100% image height, the judgment shows that the inputted image height $y_r$ is smaller than or equal to "ny−1," and step S944 is skipped. In this case, the image height $y_r$ inputted in step S942 is used as it is.

The magnification chromatic aberration correction level calculating section 213 then uses the thus set image height $y_r$ and the processed color c inputted in step S941 to determine the magnification chromatic aberration correction level M (step S945).

The magnification chromatic aberration correction level calculating section 213 selects a correction level corresponding to the image height $y_r$ and the processed color c from the magnification chromatic aberration correction levels Timg1 calculated in step S922 described above (step S945). Specifically, based on the processed color c inputted in step S941 and the integer part $y_{ri}$ of the image height $y_r$ set in steps S942 to S944 described above, a correction level specified by Timg1 [$y_{ri}$] [c] is selected. Further, a correction level specified by Timg1 [$y_{ri}$+1] [c] is selected.

The magnification chromatic aberration correction level calculating section 213 then uses the thus selected magnification chromatic aberration correction levels Timg1 [$y_{ri}$] [c] and Timg1 [$y_{ri}$+1] [c] and the image height $y_r$ to calculate the magnification chromatic aberration correction level M for the processed pixel P (step S946). The magnification chromatic aberration correction level M can be determined, for example, by using the following linear interpolation. The magnification chromatic aberration correction level M is a correction ratio.

$$M = \sum_{i=0}^{1} T_{img1}[y_{ri} + i][ch] \cdot \{(1-i) + (-1)^{i+1} \cdot y_{rf}\}$$

According to the first embodiment of the present disclosure, chromatic aberration of magnification that occurs when the aberration center Q does not coincide with the image center C can be corrected appropriately by using a correction level for correcting concentric chromatic aberration of magnification and the discrepancy between the image center C and the aberration center Q. Further, the position (coordinates) of the aberration center Q changes with the aperture value, the zoom position, the focus position, and the color. In view of this fact, the center position discrepancy is calculated by selecting center position discrepancy data 251 corresponding to the combination of an aperture value, a zoom position, a focus position, and a color from the center position discrepancy data table 250. In this way, the position of the aberration center Q can be determined precisely in accordance with the lens control state and the color of light. As a result, the chromatic aberration of magnification can be corrected precisely. Further, in the first embodiment of the present disclosure, a pixel at an image height greater than the 100% image height can also be handled, and correction data 241 corresponding to the 100% image height is applied to such a pixel. In this way, a pixel in the extra-100% image height region 301 (FIG. 14) where no correction can be made in related art can also be effectively corrected. In this case, the magnification chromatic aberration correction data table 240 may only store correction data 241 corresponding to image heights y smaller than or equal to the 100% image height, whereby the size of the correction data does not advantageously increase.

2. Second Embodiment

[Overview]

In the first embodiment described above, to correct a pixel in the extra-100% image height region 301 shown in FIG. 14, correction data 241 corresponding to the 100% image height is used. In contrast, in a second embodiment, the magnification chromatic aberration correction data table 240 has a structure in which correction data 241 corresponding to image heights y greater than the 100% image height are added and stored. In this configuration, to correct a processed pixel P located in the extra-100% image height region 301 and hence having an image height greater than the 100% image height, correction data 241 is selected by directly using an image height $n_y$ corresponding to the position of the processed pixel P and greater than the 100% image height. The magnification chromatic aberration correction level M determined based on the selected correction data 241 is used to correct chromatic aberration of magnification.

[Structure of Magnification Chromatic Aberration Correction Data Table]

Figure 15:
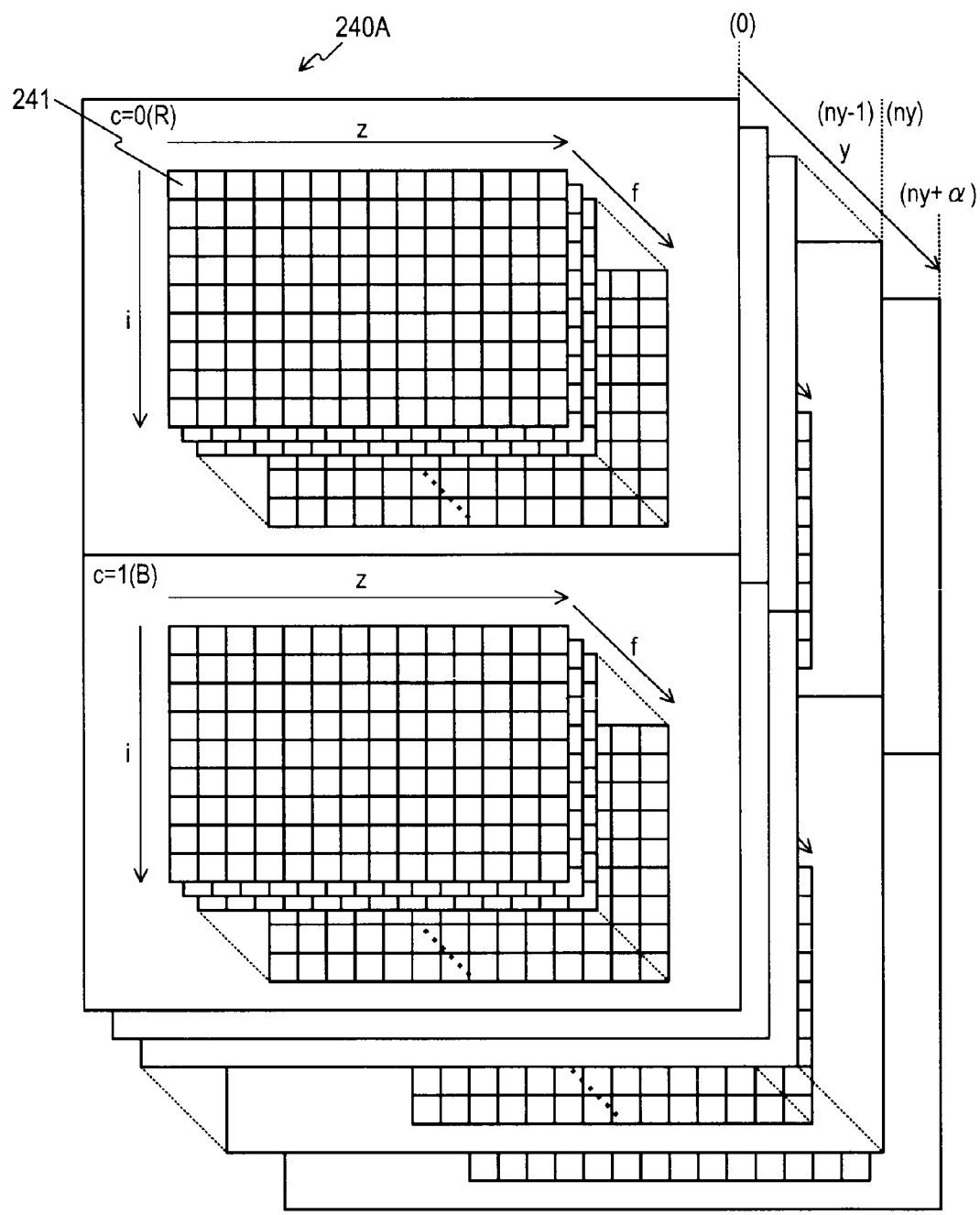
FIG. 15 shows an exemplary structure of a magnification chromatic aberration correction data table in a second embodiment of the present disclosure.

FIG. 15 shows an exemplary structure of a magnification chromatic aberration correction data table 240A in the second embodiment of the present disclosure. In FIG. 15, the same portions as those in FIG. 5 have the same reference characters, and no description of these portions will be made.

The magnification chromatic aberration correction data table 240A shown in FIG. 15 is a five-dimensional table obtained by combining aperture values i, zoom positions z, focus positions f, image heights y, and processed colors c, as in FIG. 5. It is, however noted that tables corresponding to image heights from "ny" to "ny+α" greater than the 100% image height are added in the dimension of the image height y. Correction data 241 corresponding to the image heights from "ny" to "ny+α" described above can be determined by estimating them from results of simulations based on the lens characteristics.

[Exemplary Processes Carried Out by Magnification Chromatic Aberration Corrector]

Exemplary processes for correcting chromatic aberration of magnification carried out by the magnification chromatic aberration corrector 210 in the second embodiment will next be described. The configuration of the magnification chromatic aberration corrector 210 is similar to that shown in FIG. 4 but the magnification chromatic aberration correction data table 240 shown in FIG. 5 is replaced with the magnification chromatic aberration correction data table 240A shown in FIG. 15.

The processes carried out by the magnification chromatic aberration corrector in the second embodiment are the same as those shown in FIGS. 11 and 12. It is, however, noted that the number of magnification chromatic aberration correction levels Timg1[y][c] calculated in step S922 is expressed by "((ny+α)+1)×nc" in correspondence with the structure of the magnification chromatic aberration correction data table 240A shown in FIG. 15. That is, in addition to the correction levels corresponding to the image heights from "0" to "ny−1" that are smaller than or equal to the 100% image height, correction levels corresponding to the image heights from ny to ny+α that are greater than the 100% image height are added. Further, the process of calculating the magnification chromatic aberration correction level M in step S940 shown in FIG. 12 is carried out by following the procedure shown in the flowchart in FIG. 16 instead of that shown in FIG. 13.

Figure 16:
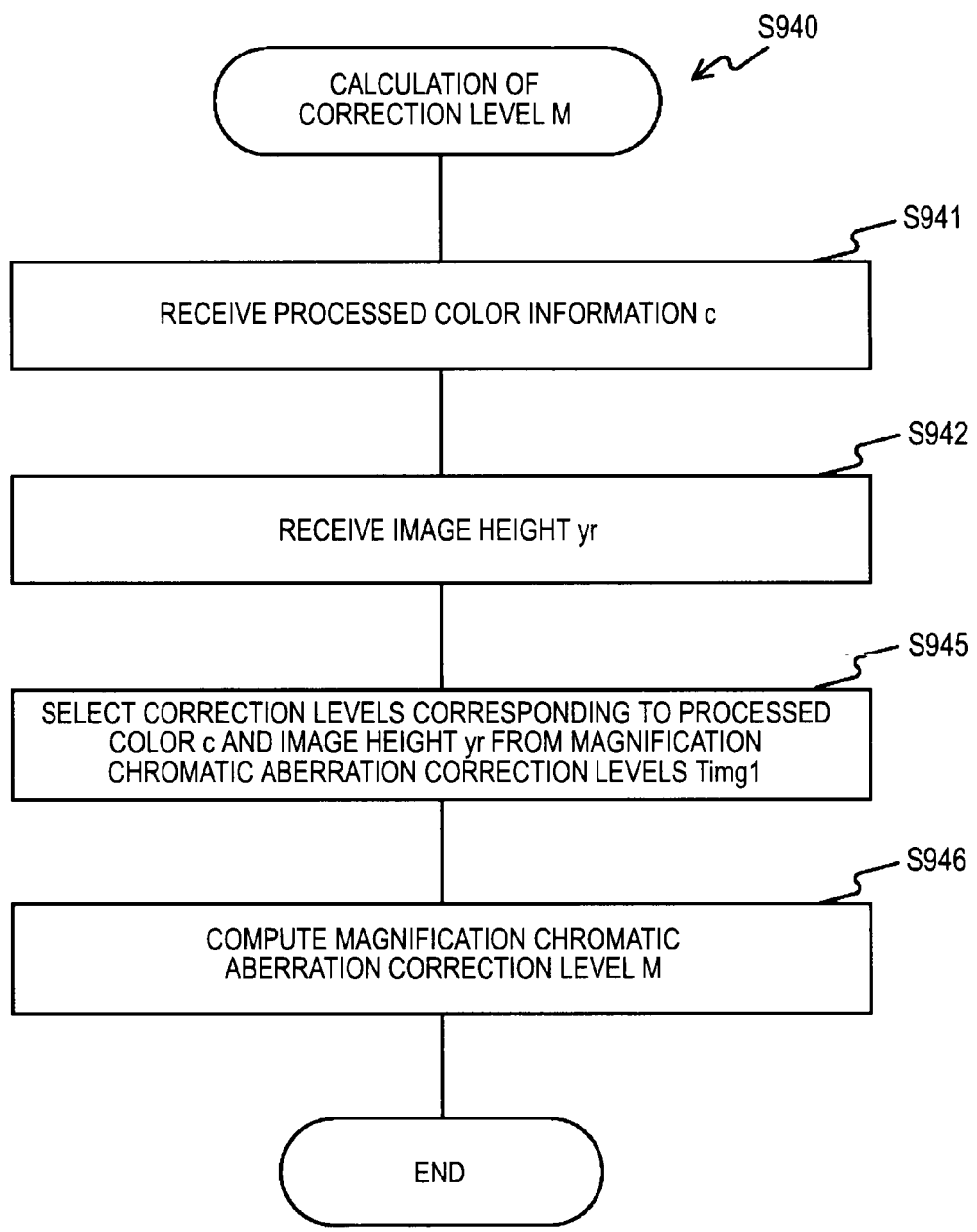
FIG. 16 shows an exemplary procedure of calculating a magnification chromatic aberration correction level in the second embodiment of the present disclosure.

In the procedure shown in FIG. 16, the color pixel selector 211 first provides the current variable c representing processed color information (step S941). Further, the image height calculating section 212 provides the image height $y_r$ calculated in step S931 described above (step S942). The processes in steps S941 and S942 are the same as those shown in FIG. 13, but the processes in steps S943 and S944 shown in FIG. 13 are not carried out but the control proceeds to step S945 in FIG. 16. That is, in the second embodiment, even when the image height $y_r$ is greater than the 100% image height, the image height $y_r$ is not replaced with "ny−1," which corresponds to the 100% image height. The image height $y_r$ inputted in step S942 is used as it is to select magnification chromatic aberration correction levels Timg1[$y_{ri}$][c] and Timg1[$y_{ri}$+1][c] in step S945. The computation for determining the magnification chromatic aberration correction level M in step S946 is the same as that shown in FIG. 13.

As described above, in the second embodiment, the magnification chromatic aberration correction data table 240A also stores correction data 241 corresponding to image heights greater than the 100% image height. A pixel in the extra-100% image height region 301 can therefore be corrected by selecting correction data 241 corresponding to the image height of the pixel from the magnification chromatic aberration correction data table 240A. In this case, a correction level used to correct a pixel at an image height greater than the 100% image height can also be calculated by performing the same computation as that performed to calculate a correction level used to correct a pixel at an image height smaller than or equal to the 100% image height. The computational load will therefore not increase. Further, a pixel at an image height greater than the 100% image height can be corrected with the same precision as that with which a pixel at an image height smaller than or equal to the 100% image height is corrected. When the center position discrepancy is significantly large, however, a distance corresponding to a 20% image height may be used as a limit. For example, there is a conceivable case where a correction data table containing correction data corresponding to up to a 20% image height is not enough because the center position discrepancy is very large and the image height at a certain pixel is greater than the 20% image height.

3. Third Embodiment

[Overview]

A third embodiment of the present disclosure will subsequently be described. In the third embodiment, the magnification chromatic aberration correction data table 240 stores correction data 241 corresponding to the image heights y up to the 100% image height, that is, from the image height corresponding to "0" to the image height corresponding to "ny−1," as in FIG. 5. With the thus configured magnification chromatic aberration correction data table, a processed pixel at an image height greater than the 100% image height is also corrected by determining an accurate magnification chromatic aberration correction level, as will be described below. The configuration of the magnification chromatic aberration corrector 210 in the third embodiment may be the same as that in FIG. 4.

[Exemplary Processes Carried Out by Magnification Chromatic Aberration Corrector]

Figure 17:
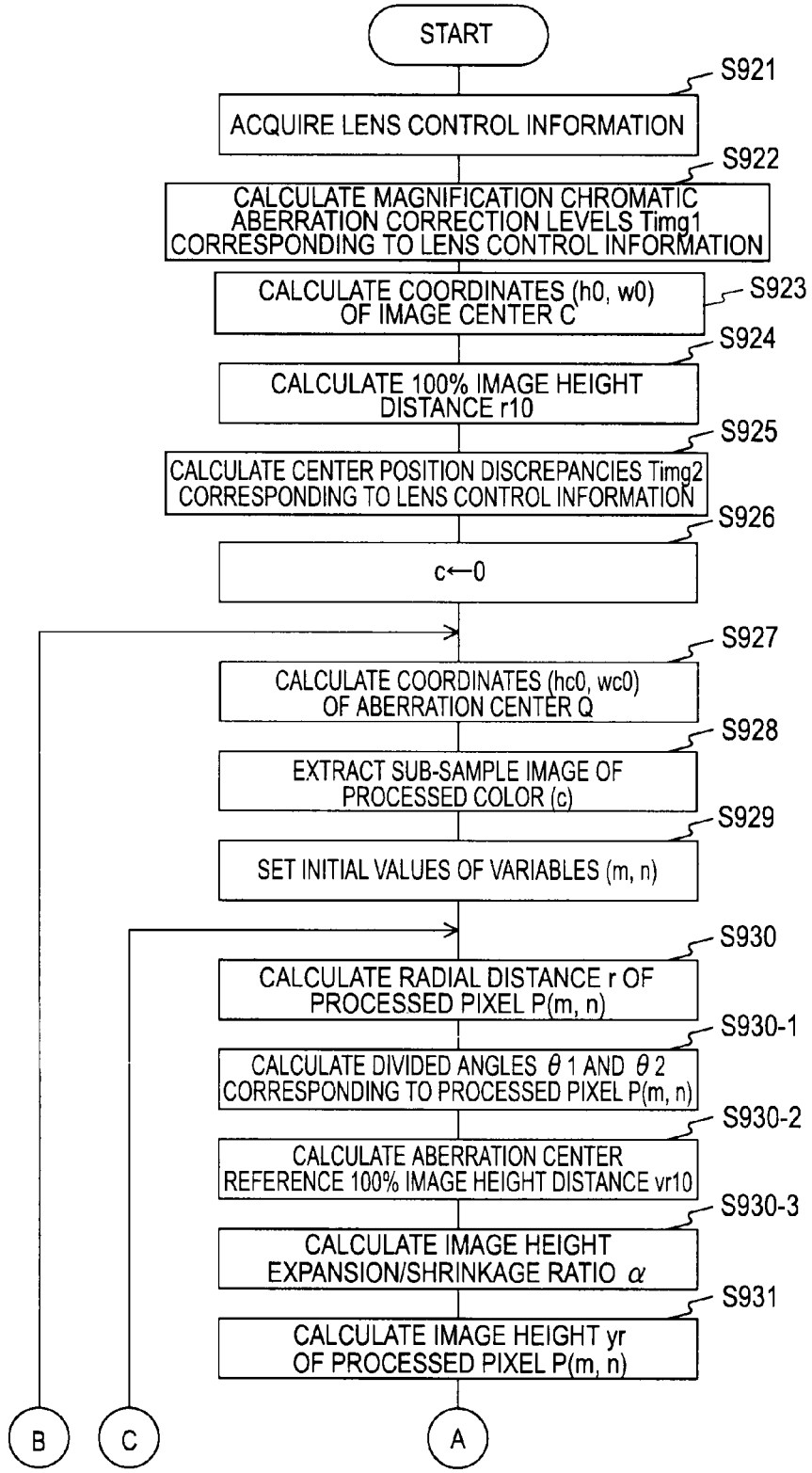
FIG. 17 shows exemplary processes carried out by a magnification chromatic aberration corrector in a third embodiment of the present disclosure.

Exemplary processes for correcting chromatic aberration of magnification carried out by the magnification chromatic aberration corrector 210 in the third embodiment will be described with reference to the flowcharts in FIGS. 17 and 18. In FIG. 17, the steps having the same processes as those in steps in FIG. 11 have the same reference characters as those in FIG. 11.

The processes in step S921 to S930 in FIG. 17 are the same as those in steps S921 to S930 in FIG. 11.

In the third embodiment, after the radial distance r is calculated in step S930, the processes in step S930-1 to S930-3 are carried out as follows.

Figure 19A:
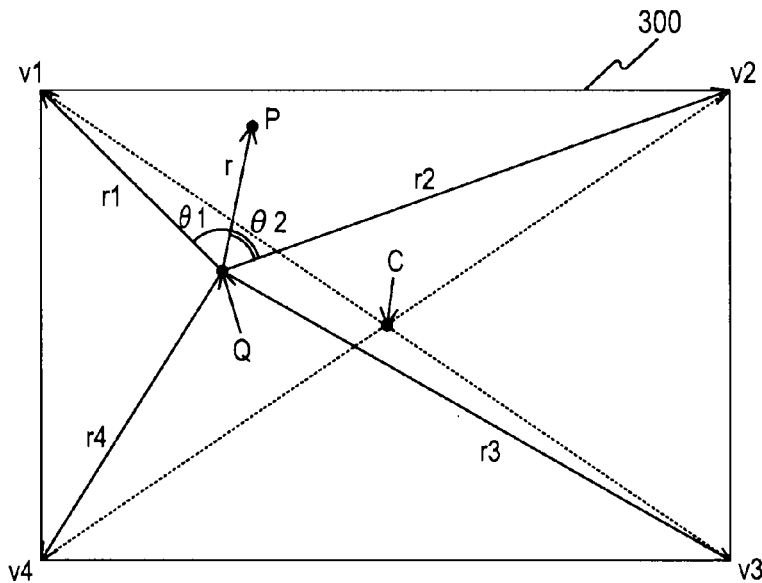
FIGS. 19A and 19B describe an aberration center reference 100% image height distance in the third embodiment of the present disclosure.

In step S930-1, the image height calculating section 212 first calculates two divided angles θ1 and θ2 corresponding to the processed pixel P. FIG. 19A shows an example of the relationship between the processed pixel P and the divided angles θ1, θ2 in the image area 300. In FIG. 19A, the aberration center Q is located in a position shifted upward and leftward from the image center C. Further, in the image area 300, the processed pixel P in this case is positioned in a triangular region having the following three vertices: the vertices v1 and v2 of the image area 300 and the aberration center Q. In this state, the angle formed by connecting the vertex v1, the aberration center Q, and the processed pixel P is the divided angle θ1, and the angle formed by connecting the vertex v2, the aberration center Q, and the processed pixel P is the divided angle θ2. That is, among the four triangular regions formed by dividing the image area 300 with the lines connecting the aberration center Q to the vertices of the image area 300, the divided angles θ1 and θ2 form the angle of the vertex at the aberration center Q of the triangular region containing the processed pixel P. The two angles obtained by dividing the angle of the vertex at the aberration center Q with the line connecting the processed pixel P to the aberration center Q are the divided angles θ1 and θ2.

The divided angle θ1 can be determined as the angle between the vector corresponding to the radial distance r1 from the aberration center Q to the vertex v1 and the vector corresponding to the radial distance r from the aberration center Q to the processed pixel P. Similarly, the divided angle θ2 can be determined as the angle between the vector corresponding to the radial distance r2 from the aberration center Q to the vertex v2 and the vector corresponding to the radial distance r from the aberration center Q to the processed pixel P.

The image height calculating section 212 then calculates a 100% image height distance vr10 with respect to the aberration center that corresponds to the processed pixel P in step S930-2. The aberration center reference 100% image height distance vr10 will be described with reference to FIG. 19B. The 100% image height distance r10 determined in step S924 described above represents the radial distance from the image center C to a vertex of the image area 300. That is, the 100% image height distance r10 is determined with respect to the image center C. On the other hand, the aberration center reference 100% image height distance vr10 is the radial distance from the aberration center Q, which is the reference, to each vertex of the image area 300. That is, the radial distance r1 from the aberration center Q to the vertex v1 is first taken as the aberration center reference 100% image height distance vr10. Similarly, the remaining radial distances r2, r3, and r4 from the aberration center Q to the vertices v2, v3, and v4 are also taken as the 100% image height. The 100% image height distance r10 with respect to the image center C follows a perfect circular path having a radius equal to the distance from the image center C to a vertex of the image area 300. On the other hand, in the case of the aberration center reference 100% image height distance vr10, the fact that the aberration center Q does not coincide with the image center C causes the distances from the aberration center Q to the vertices v1, v2, v3, and v4 of the image area 300 not to be the same. The path of the aberration center reference 100% image height distance vr10 is not therefore a perfect circle. The aberration center reference 100% image height distance vr10, which therefore changes with the radial direction, can be determined depending on the radial direction by using interpolation based on the divided angles θ1 and θ2. Specifically, the aberration center reference 100% image height distance vr10 in the radial direction where the processed pixel P is positioned shown in FIG. 19B can be determined by using the divided angles θ1 and θ2 and the radial distances r1 and r2 as follows.

$$vr10=(\theta2/(\theta1+\theta2))\times r1+(\theta1/(\theta1+\theta2))\times r2$$

Figure 19B:
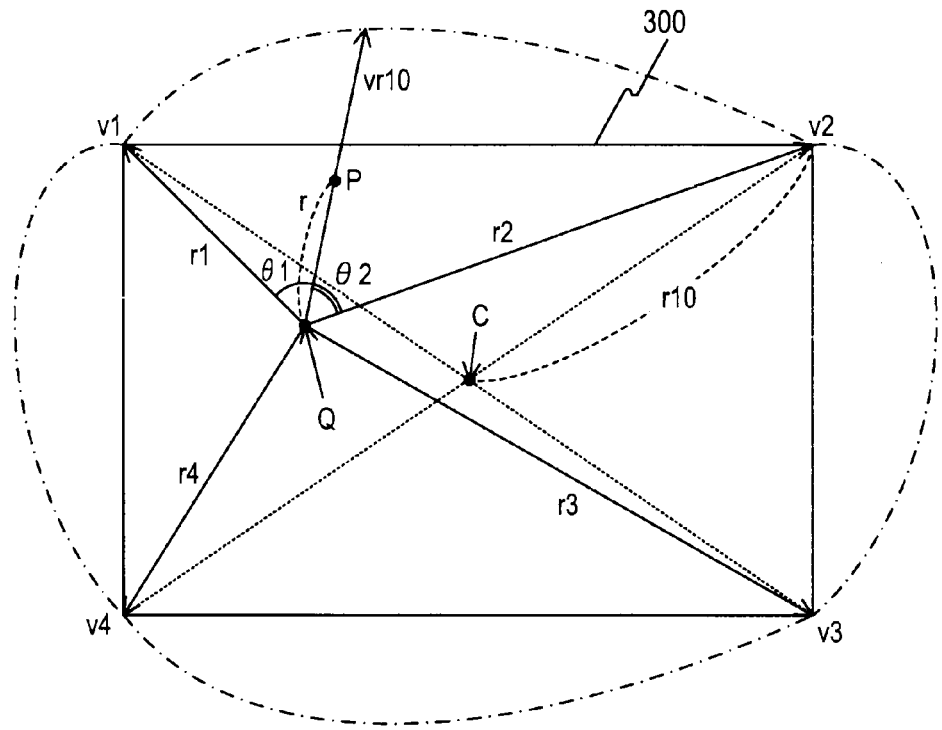

The path indicated by the dashed line in FIG. 19B diagrammatically shows the path of the aberration center reference 100% image height distance vr10 determined by using the above equation.

The image height calculating section 212 then calculates an image height expansion/shrinkage ratio α in step S930-3. The image height expansion/shrinkage ratio α represents how much the aberration center reference 100% image height distance vr10 is expanded or shrunk with respect to the inherent 100% image height distance r10 and can be expressed in the form of ratio as follows.

$$\alpha=vr10/r10$$

The image height expansion/shrinkage ratio α is used to calculate the magnification chromatic aberration correction level M.

The image height calculating section 212 then calculates the image height $y_r$ of the processed pixel P in step S931. The image height $y_r$ in the third embodiment is calculated with respect to the aberration center reference 100% image height distance vr10 instead of the inherent 100% image height distance r10. The image height $y_r$ is determined as follows.

$$y_r=(r/vr10)\times(ny-1)$$

In the third embodiment, the procedure of correcting chromatic aberration of magnification subsequent to step S931 described above is the same as the procedure from step S940 to step S939 shown in FIG. 12. The calculation of the magnification chromatic aberration correction level M in step S940 is, however, performed by following the procedure shown in the flowchart in FIG. 18.

Figure 18:
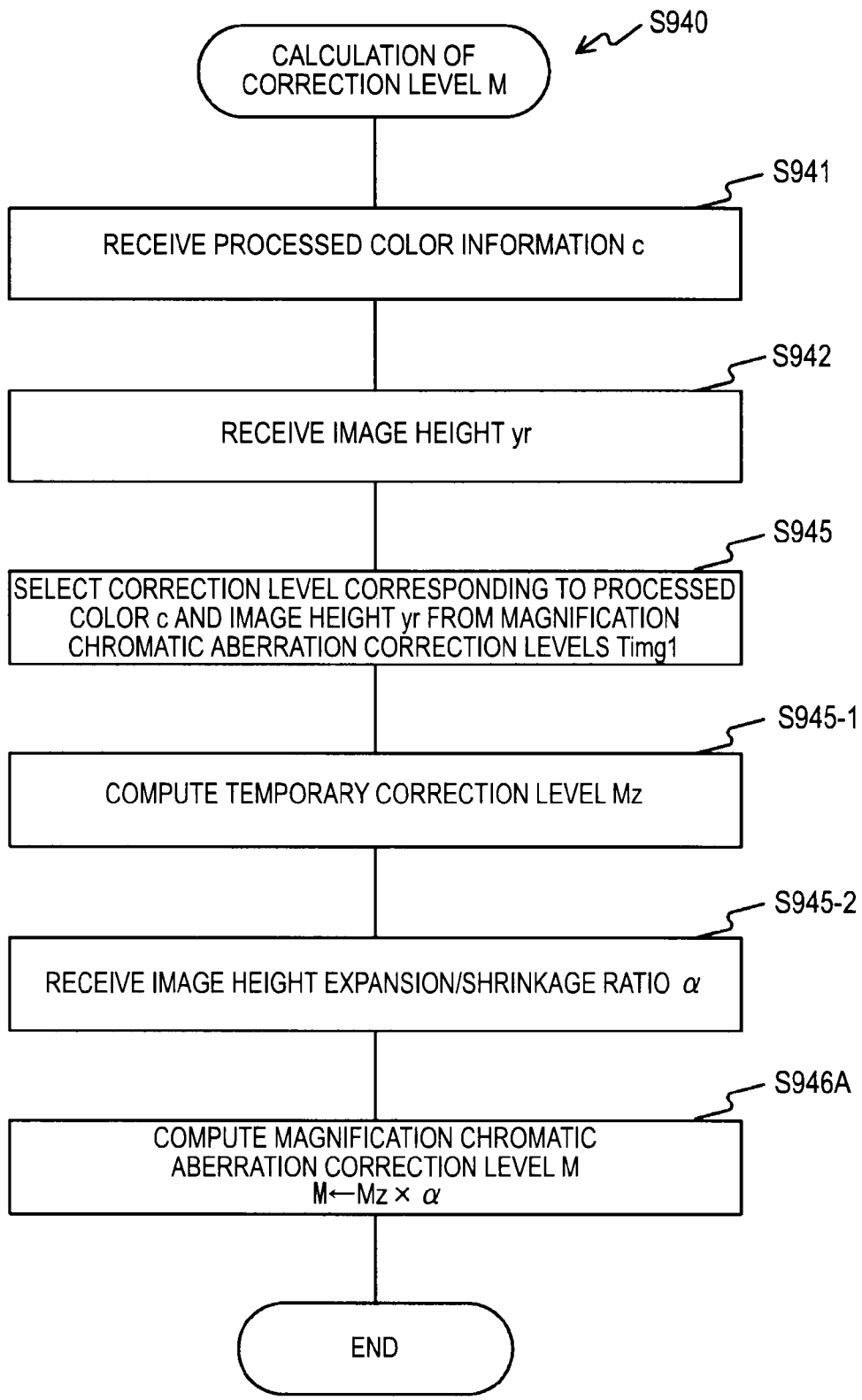
FIG. 18 shows an exemplary procedure of calculating a magnification chromatic aberration correction level in the third embodiment of the present disclosure.

In FIG. 18, the processes in step S941, S942, and S945 are the same as those in step S941, S942, and S945 in FIG. 16. The magnification chromatic aberration correction level calculating section 213 then determines a temporary correction level Mz in step S945-1. The temporary correction level Mz to be determined in step S945-1 is determined by performing the same computation as that used to determine the magnification chromatic aberration correction level M in step S946 in FIG. 16. The temporary correction level Mz is determined in correspondence with the image height of the processed pixel P based on the 100% image height distance r10 with respect to the image center C, as understood from the description about the magnification chromatic aberration correction level M in the first and second embodiments. That is, the temporary correction level Mz is not determined based on the aberration center reference 100% image height distance vr10.

In step S945-2, the magnification chromatic aberration correction level calculating section 213 receives the image height expansion/shrinkage ratio α determined in step S930-3 in FIG. 17 and determines the magnification chromatic aberration correction level M by performing the following computation in step S946A.

$$M=Mz\times\alpha$$

That is, the magnification chromatic aberration correction level M is determined by expanding or shrinking the temporary correction level Mz based on the image height expansion/shrinkage ratio α. The magnification chromatic aberration correction level M thus has a value corresponding to the image height of the processed pixel P that has the aberration center reference 100% image height distance vr10. That is, a correct correction level for the processed pixel P is obtained.

As described above, in the third embodiment, the aberration center reference 100% image height distance vr10 for a processed pixel P is determined, and the magnification chromatic aberration correction level M is determined based on the ratio of the aberration center reference 100% image height distance vr10 to the inherent 100% image height distance r10. In this way, the magnification chromatic aberration correction data table 240 that stores correction data 241 corresponding to image heights y up to the 100% image height can be used to precisely correct a pixel at an image height greater than the 100% image height. That is, chromatic aberration of magnification can be corrected very well without any increase in data size of the magnification chromatic aberration correction data table 240.

Fourth Embodiment

[Overview]

A fourth embodiment of the present disclosure will subsequently be described. In the description of the first embodiment, the center position discrepancy data table 250 is created for each product of the video camcorder 100 in order to eliminate individual product variation. That is, the chart image 400 is actually captured to measure the position of the aberration center Q for each product of the video camcorder 100, and the center position discrepancy data table 250 is created based on the measured position of the aberration center Q.

In contrast, the position of the aberration center Q is not measured in the fourth embodiment. Instead, in the fourth embodiment, a plurality of center position discrepancy data tables 250 created in advance based on different aberration centers Q are provided in a manufacturing step. The center position discrepancy data tables 250 are used one by one to correct chromatic aberration of magnification, and the center position discrepancy data table 250 based on which the best correction result is obtained is stored in the video camcorder 100. The magnification chromatic aberration correction data table 240 may be created based on the characteristics of the optical lens section 101 and stored in the video camcorder 100 and may be common to each of the plurality of center position discrepancy data tables 250.

[Exemplary Pattern of Center Position Discrepancy Data Table]

An exemplary set of the center position discrepancy data tables 250 provided in advance will be described with reference to FIGS. 20A to 20D and 21A to 21D. FIGS. 20A to 20D and 21A to 21D diagrammatically show the positional relationship between the positions of the aberration centers Q set in the center position discrepancy data tables 250 and the image center C in the image area 300.

Figure 20A:
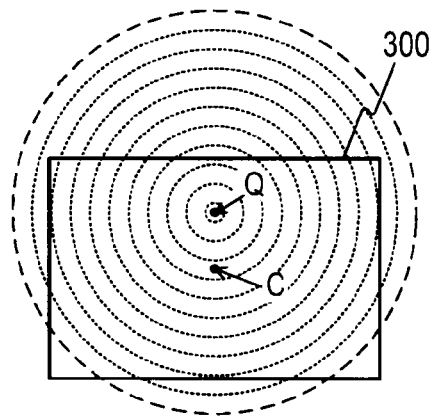
FIGS. 20A to 20D diagrammatically show an exemplary set of center position discrepancy data tables provided in advance in a fourth embodiment of the present disclosure.

In this example, eight center position discrepancy data tables 250 are provided, as shown in FIGS. 20A to 20D and 21A to 21D. A first center position discrepancy data table 250 is so provided that the aberration center Q is set in a predetermined position immediately above the image center C as shown in FIG. 20A. The aberration center Q corresponds, for example, to the combination of a specific aperture value i, zoom position z, focus position f, and processed color c and actually moves around in a predetermined range in accordance with the combination of the aperture value i, the zoom position z, the focus position f, and the processed color c.

Figure 20B:
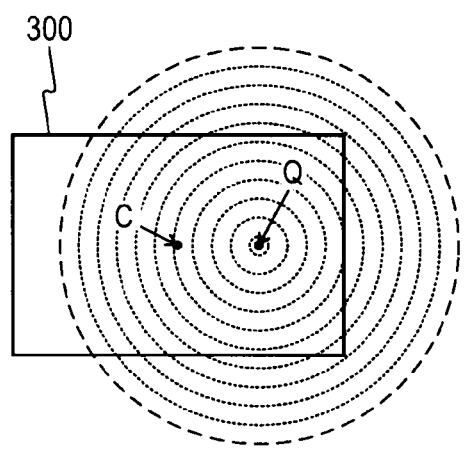
Figure 20C:
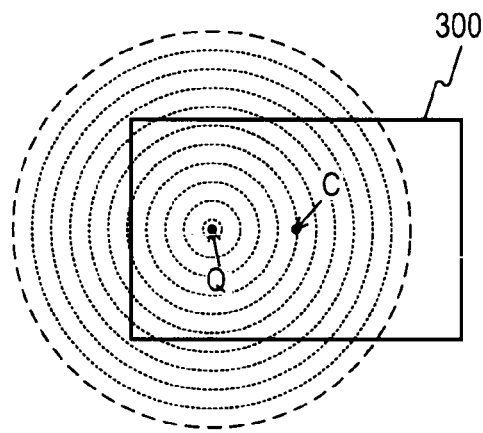
Figure 20D:
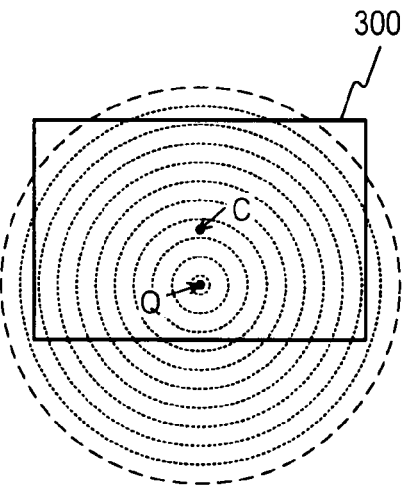

A second center position discrepancy data table 250 is so provided that the aberration center Q is set in a predetermined position to the right of the image center C as shown in FIG. 20B. A third center position discrepancy data table 250 is so provided that the aberration center Q is set in a predetermined position to the left of the image center C as shown in FIG. 20C. A fourth center position discrepancy data table 250 is so provided that the aberration center Q is set in a predetermined position immediately below the image center C as shown in FIG. 20D.

Figure 21A:
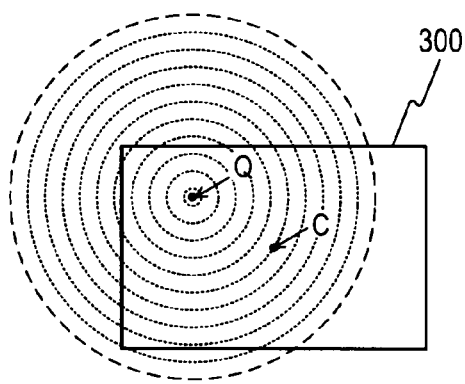
FIGS. 21A to 21D diagrammatically show another exemplary set of center position discrepancy data tables provided in advance in the fourth embodiment of the present disclosure.
Figure 21B:
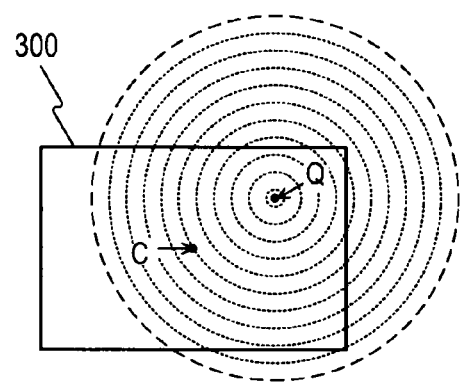
Figure 21C:
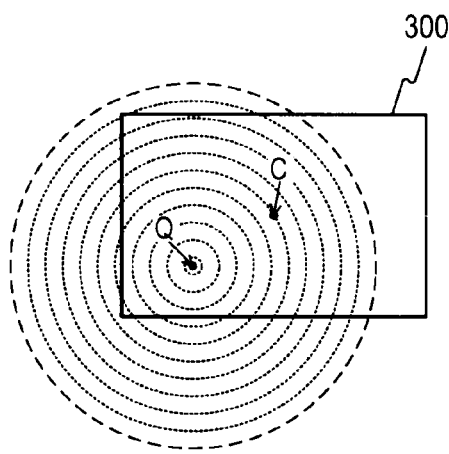
Figure 21D:
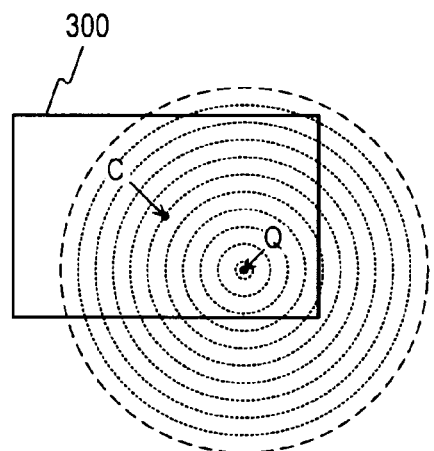

A fifth center position discrepancy data table 250 is so provided that the aberration center Q is set in a predetermined position shifted upward and leftward from the image center C as shown in FIG. 21A. A sixth center position discrepancy data table 250 is so provided that the aberration center Q is set in a predetermined position shifted upward and rightward from the image center C as shown in FIG. 21B. A seventh center position discrepancy data table 250 is so provided that the aberration center Q is set in a predetermined position shifted downward and leftward from the image center C as shown in FIG. 21O. An eighth center position discrepancy data table 250 is so provided that the aberration center Q is set in a predetermined position shifted downward and rightward from the image center C as shown in FIG. 21D.

In a manufacturing step, the video camcorder 100 sequentially uses the center position discrepancy data tables 250 shown in FIGS. 20A to 20D and 21A to 21D to correct chromatic aberration of magnification. In the correction of chromatic aberration of magnification, an image of a chart having a predetermined pattern is captured, and the magnification chromatic aberration corrector 210 corrects chromatic aberration of magnification. The chromatic separation level left in the captured image having undergone the correction is then evaluated. Among several conceivable evaluation methods, an image of a chart having a white and black pattern is captured. In this case, color components that appear in the captured image are assumed to be those resulting from the chromatic aberration of magnification, and the absolute values of the color components are integrated or the squares of the values of the color components are integrated to determine the amount of residual aberration. The center position discrepancy data table 250 that provides the least amount of residual aberration in the correction operation is stored in the video camcorder 100.

As described above, in the fourth embodiment, among the center position discrepancy data tables 250 provided in advance in a manufacturing step, the one that provides the best correction effect is selected and stored in the video camcorder 100. Carrying out the steps described above eliminates, for example, the need to measure and determine the aberration center Q corresponding to each combination of the representative parameters, whereby the work period is greatly reduced.

In the fourth embodiment, the number of center position discrepancy data tables 250 to be provided in advance and the position of the aberration center Q set for each of the center position discrepancy data tables 250 are not limited to those shown in FIGS. 20A to 20D and 21A to 21D but a variety of other numbers and positions are conceivable. In practice, the number of center position discrepancy data tables 250 to be provided and the position of the aberration center Q are determined in consideration of work efficiency, necessary correction precision, and other factors.

In the description of the above embodiments, the center position discrepancy data table 250 holds the center position discrepancy data 251 representing the amount of relative discrepancy from the image center C. The reason for this is that even when the position of the lens optical axis is changed in response, for example, to the hand-shake correction control described above, the accurate position of the aberration center Q can be determined in correspondence with the changed optical axis (image center C). In contrast, when the lens optical axis is not dynamically changed but is fixed, a table that stores data on the coordinates of the aberration center Q in the image area may be provided as an equivalent to the center position discrepancy data table 250. It can be said in this case that the absolute value of discrepancy between the image center C and the aberration center Q is represented by the coordinates of the aberration center Q.

The components used to correct chromatic aberration of magnification, which are accommodated in the video camcorder 100 or other imaging apparatus in the description of the above embodiments, can be replaced with an application program run on a personal computer or any other apparatus.

The embodiments of the present disclosure are presented by way of example for embodying the present disclosure. As explicitly stated in the embodiments of the present disclosure, items in the embodiments of the present disclosure are related to specific subject matters set forth in the appended claims. Similarly, the specific subject matters in the appended claims are related to the items having the same names in the embodiments of the present disclosure. It is, however, noted that the present disclosure is not limited to the embodiments but can be embodied with a variety of changes made to the embodiments to the extent that they do not depart from the substance of the present disclosure.

Each of the procedures described in the embodiments of the present disclosure may be taken as a method including a series of processes of the procedure or may be taken as a program that instructs a computer to carry out the procedure or a recording medium on which the program is recorded. Examples of the recording medium may include a CD (compact disc), an MD (minidisc), a DVD (digital versatile disk), a memory card, and a Blu-ray Disc®.

The present disclosure contains subject matter related to that disclosed in Japanese Priority Patent Application JP 2010-210692 filed in the Japan Patent Office on Sep. 21, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An aberration correction apparatus comprising:
   a correction data holding section that holds correction data on a correction level used to correct chromatic aberration of magnification, the correction data provided for each predetermined combination of aberration variation conditions that change a chromatic separation level due to the chromatic aberration of magnification and include at least an image height;
   a center position discrepancy data holding section that holds center position discrepancy data on the discrepancy between the center of an image area and the position of an aberration center of the chromatic aberration of magnification, the center position discrepancy data provided for each combination of predetermined discrepancy variation conditions that change the discrepancy;
   an aberration center calculating section that selects one of the center position discrepancy data that corresponds to a combination of the discrepancy variation conditions in an imaging apparatus and calculates the position of the aberration center based on the selected center position discrepancy data;
   an image height calculating section that calculates an aberration center corresponding image height of a processed pixel with respect to the position of the aberration center;
   a magnification chromatic aberration correction level calculating section that selects one of the correction data that corresponds to a combination of the aberration variation conditions in the imaging apparatus and calculates a magnification chromatic aberration correction level based on the selected correction data; and
   a pixel value correcting section that corrects the pixel value of the processed pixel based on the calculated magnification chromatic aberration correction level.

2. The aberration correction apparatus according to claim 1,
   wherein the image height calculating section calculates the aberration center corresponding image height provided that the distance from the aberration center to each vertex of the image area is a 100% image height and an aberration center reference 100% image height distance in a radial direction passing through the processed pixel with respect to the position of the aberration center, and
   the correction level calculating section calculates the magnification chromatic aberration correction level based on the ratio of the aberration center reference 100% image height distance to a 100% image height distance corresponding to the distance from the center of the image area to a vertex thereof.

3. The aberration correction apparatus according to claim 1,
   wherein the magnification chromatic aberration correction level calculating section, when the aberration center corresponding image height is greater than a 100% image height corresponding to the distance from the center of the image area to a vertex thereof, selects one of the correction data that corresponds to the combination of the current aberration variation conditions including the aberration center corresponding image height replaced with the 100% image height.

4. The aberration correction apparatus according to claim 1,
   wherein the correction data holding section holds correction data corresponding to image heights up to a predetermined value greater than a 100% image height corresponding to the distance from the center of the image area to a vertex thereof.

5. The aberration correction apparatus according to claim 1,
   wherein the discrepancy variation conditions include at least one of the color of light and predetermined lens control information.

6. The aberration correction apparatus according to claim 5,
   wherein the lens control information represents control states of one or more predetermined movable portions in a lens section.

7. The aberration correction apparatus according to claim 1,
   wherein the center position discrepancy data are produced, with two or more figure portions in a captured image being base points, based on an aberration center determined based on the intersection of straight lines drawn in the directions of chromatic aberration of magnification that occurs at the figure portions.

8. The aberration correction apparatus according to claim 1,
   wherein the center position discrepancy data holding section holds, among a plurality of sets of center position discrepancy data representing discrepancies of the positions of different aberration centers, center position discrepancy data that provides the least amount of residual aberration at a processed pixel having undergone the pixel value correction performed by the pixel value correcting section.

9. An aberration correction method comprising:

selecting, from center position discrepancy data on the discrepancy between the center of an image area and the position of an aberration center of chromatic aberration of magnification, the center position discrepancy data provided for each combination of predetermined discrepancy variation conditions that change the discrepancy, one of the center position discrepancy data that corresponds to a combination of the discrepancy variation conditions in an imaging apparatus and calculating the position of the aberration center based on the selected center position discrepancy data;

calculating an aberration center corresponding image height of a processed pixel with respect to the position of the aberration center;

selecting, from correction data on a correction level used to correct the chromatic aberration of magnification, the correction data provided for each predetermined combination of aberration variation conditions that change a chromatic separation level due to the chromatic aberration of magnification and includes at least an image height, one of the correction data that corresponds to a combination of the aberration variation conditions in the imaging apparatus and calculating a magnification chromatic aberration correction level based on the selected correction data; and correcting the pixel value of the processed pixel based on the calculated magnification chromatic aberration correction level.

10. A non-transitory recording medium storing a program that instructs an aberration correction apparatus to execute the processing comprising:

selecting, from center position discrepancy data on the discrepancy between the center of an image area and the position of an aberration center of chromatic aberration of magnification, the center position discrepancy data provided for each combination of predetermined discrepancy variation conditions that change the discrepancy, one of the center position discrepancy data that corresponds to a combination of the discrepancy variation conditions in an imaging apparatus and calculating the position of the aberration center based on the selected center position discrepancy data;

calculating an aberration center corresponding image height of a processed pixel with respect to the position of the aberration center;

selecting, from correction data on a correction level used to correct the chromatic aberration of magnification, the correction data provided for each predetermined combination of aberration variation conditions that change a chromatic separation level due to the chromatic aberration of magnification and includes at least an image height, one of the correction data that corresponds to a combination of the aberration variation conditions in the imaging apparatus and calculating a magnification chromatic aberration correction level based on the selected correction data; and correcting the pixel value of the processed pixel based on the calculated magnification chromatic aberration correction level.

* * * * *